(12) United States Patent
Wolfgang et al.

(10) Patent No.: US 8,002,405 B2
(45) Date of Patent: Aug. 23, 2011

(54) PROGRESSIVE POWER LENS MANUFACTURING METHOD AND PROGRESSIVE POWER LENS

(75) Inventors: Eichin Wolfgang, Tokyo (JP); Akira Kitani, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 12/733,883

(22) PCT Filed: Oct. 10, 2008

(86) PCT No.: PCT/JP2008/068424
§ 371 (c)(1),
(2), (4) Date: Mar. 25, 2010

(87) PCT Pub. No.: WO2009/048124
PCT Pub. Date: Apr. 16, 2009

(65) Prior Publication Data
US 2010/0245753 A1    Sep. 30, 2010

(30) Foreign Application Priority Data
Oct. 10, 2007  (JP) ................................. 2007-264868

(51) Int. Cl.
*G02C 7/06* (2006.01)
(52) U.S. Cl. ........................................ 351/168; 351/177
(58) Field of Classification Search .................. 351/161, 351/164–172, 177
See application file for complete search history.

(56) References Cited

U.S. PATENT DOCUMENTS

| | | |
|---|---|---|
| 2002/0018178 A1 | 2/2002 | Shirayanagi et al. |
| 2003/0048408 A1 | 3/2003 | Yamamoto et al. |
| 2003/0123025 A1 | 7/2003 | Shirayanagi |
| 2004/0045633 A1 | 3/2004 | Loth |
| 2006/0176446 A1* | 8/2006 | Kaga ........................... 351/177 |

FOREIGN PATENT DOCUMENTS

| | | |
|---|---|---|
| EP | 1 906 227 A1 | 4/2008 |
| JP | A-10-175149 | 6/1998 |
| JP | A-2002-24316 | 1/2002 |
| JP | A-2003-84244 | 3/2003 |

(Continued)

OTHER PUBLICATIONS

International Search Report issued on Jan. 20, 2009 in International Application No. PCT/JP2008/068424 (with translation). International Preliminary Report on Patentability issued on May 11, 2010 in International Application No. PCT/JP2008/068424.

*Primary Examiner* — Darryl J Collins
(74) *Attorney, Agent, or Firm* — Oliff & Berridge, PLC

(57) ABSTRACT

A method provides for manufacturing progressive-power lenses in a manner in which an inventory burden of semis can be reduced. A progressive-power lens is designed by arranging a progressive-power surface on a convex surface and combining the convex surface with a concave surface so as to meet prescription values of a spectacles wearer. The method for manufacturing progressive-power lenses includes previously preparing the concave surface side as a concave surface semi group based on a predetermined classification table, selecting a most suitable semi-finished lens according to an order, designing a progressive-power surface on the convex surface side by adding the difference between cylindrical component of a most suitable concave surface semi selected based on an order and cylindrical component of the prescription values to the concave surface side so as to meet the prescription values, and finishing the lens by performing free-form processing.

10 Claims, 19 Drawing Sheets

FOREIGN PATENT DOCUMENTS

| | | |
|---|---|---|
| JP | A-2003-121801 | 4/2003 |
| JP | A-2004-45633 | 2/2004 |
| JP | A-2006-178245 | 7/2006 |
| JP | A-2006-312233 | 11/2006 |
| WO | WO 98/16862 | 4/1998 |
| WO | WO 2005/084885 A1 | 9/2005 |
| WO | WO 2006/137489 A1 | 12/2006 |

* cited by examiner

X方向

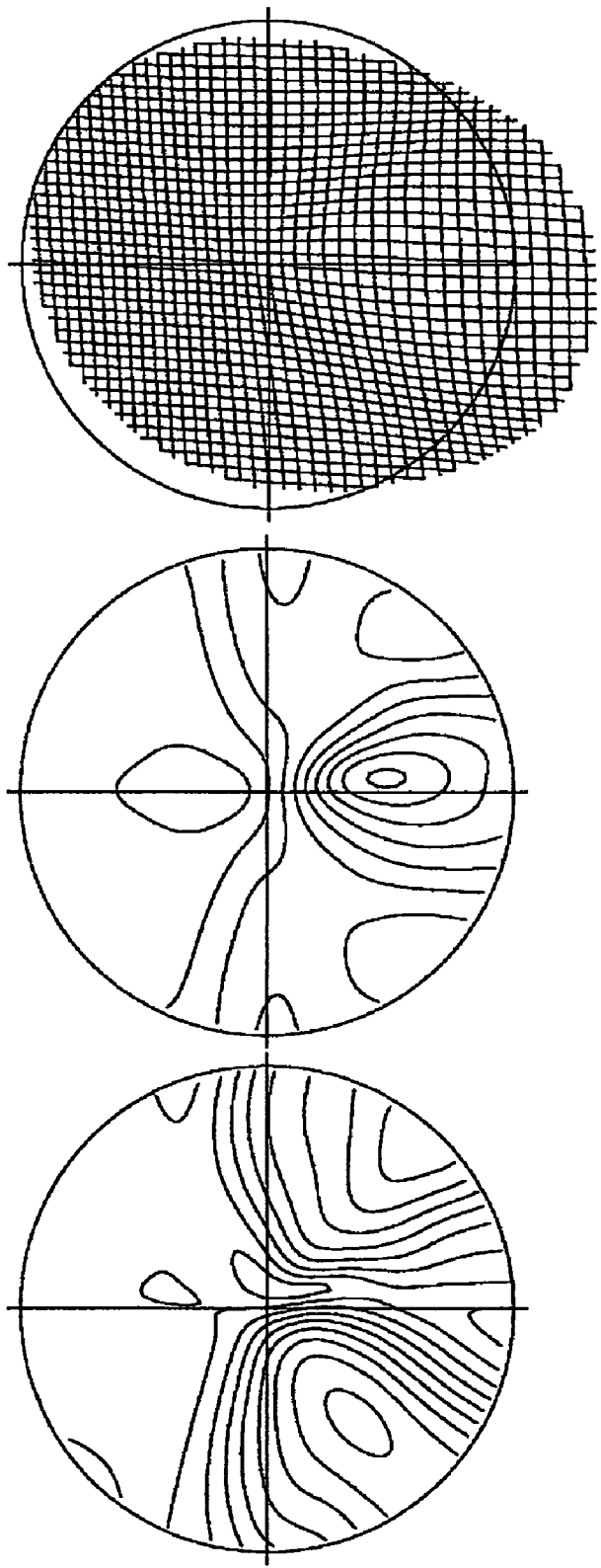

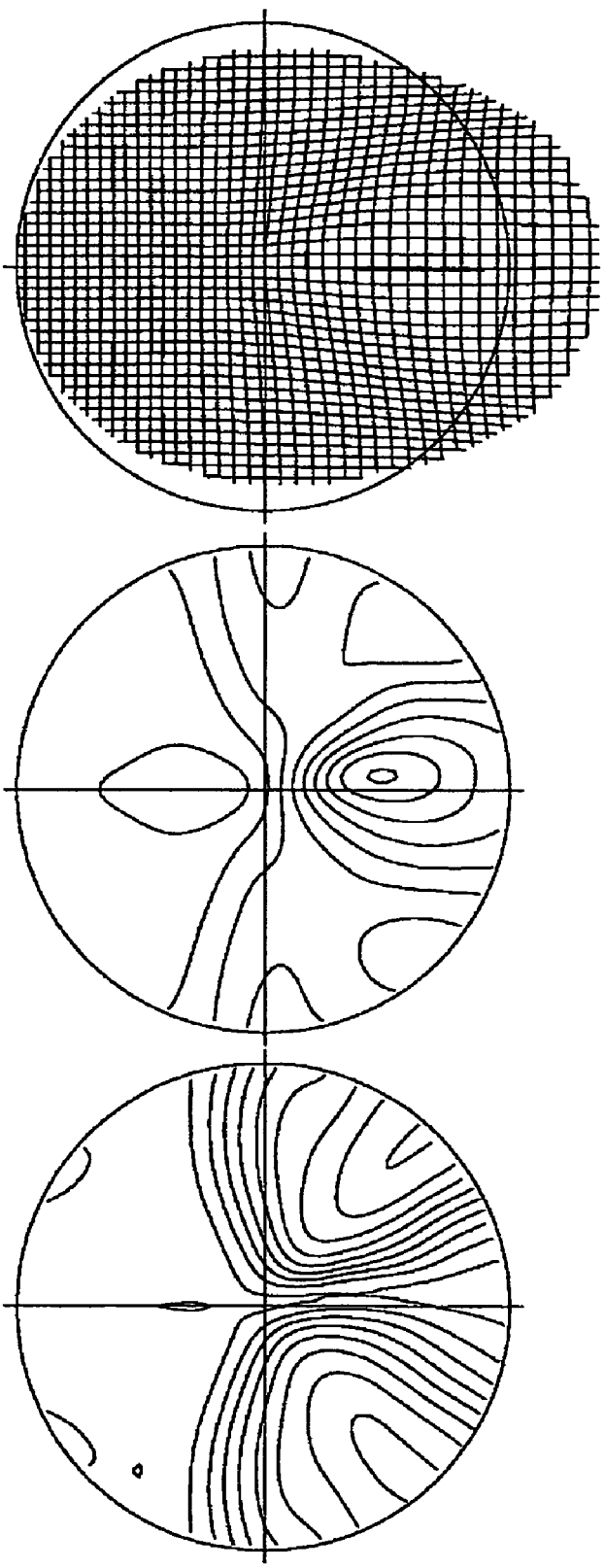

FIG. 12

| SPH/CYL | 0.00 | -0.25 | -0.50 | -0.75 | -1.00 | -1.25 | -1.50 | -1.75 | -2.00 | -2.25 | -2.50 | -2.75 | -3.00 | -3.25 | -3.50 | -3.75 | -4.00 | |
|---|---|---|---|---|---|---|---|---|---|---|---|---|---|---|---|---|---|---|
| +8.00 | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 | |
| +7.75 | 1.25 | 1.25 | 1.25 | 1.25 | 1.25 | 1.25 | 1.25 | 1.25 | 1.25 | 1.25 | 1.25 | 1.25 | 1.25 | 1.25 | 1.25 | 1.25 | 1.25 | |
| +7.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | |
| +7.25 | 1.75 | 1.75 | 1.75 | 1.75 | 1.75 | 1.75 | 1.75 | 1.75 | 1.75 | 1.75 | 1.75 | 1.75 | 1.75 | 1.75 | 1.75 | 1.75 | 1.75 | |
| +7.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | |
| +6.75 | 2.25 | 2.25 | 2.25 | 2.25 | 2.25 | 2.25 | 2.25 | 2.25 | 2.25 | 2.25 | 2.25 | 2.25 | 2.25 | 2.25 | 2.25 | 2.25 | 2.25 | 9.00BC |
| +6.50 | 2.50 | 2.50 | 2.50 | 2.50 | 2.50 | 2.50 | 2.50 | 2.50 | 2.50 | 2.50 | 2.50 | 2.50 | 2.50 | 2.50 | 2.50 | 2.50 | 2.50 | |
| +6.25 | 2.75 | 2.75 | 2.75 | 2.75 | 2.75 | 2.75 | 2.75 | 2.75 | 2.75 | 2.75 | 2.75 | 2.75 | 2.75 | 2.75 | 2.75 | 2.75 | 2.75 | |
| +6.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | |
| +5.75 | 3.25 | 3.25 | 3.25 | 3.25 | 3.25 | 3.25 | 3.25 | 3.25 | 3.25 | 3.25 | 3.25 | 3.25 | 3.25 | 3.25 | 3.25 | 3.25 | 3.25 | |
| +5.50 | 3.50 | 3.50 | 3.50 | 3.50 | 3.50 | 3.50 | 3.50 | 3.50 | 3.50 | 3.50 | 3.50 | 3.50 | 3.50 | 3.50 | 3.50 | 3.50 | 3.50 | |
| +5.25 | 3.75 | 3.75 | 3.75 | 3.75 | 3.75 | 3.75 | 3.75 | 3.75 | 3.75 | 3.75 | 3.75 | 3.75 | 3.75 | 3.75 | 3.75 | 3.75 | 3.75 | |
| +5.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | |
| +4.75 | 2.25 | 2.25 | 2.25 | 2.25 | 2.25 | 2.25 | 2.25 | 2.25 | 2.25 | 2.25 | 2.25 | 2.25 | 2.25 | 2.25 | 2.25 | 2.25 | 2.25 | |
| +4.50 | 2.50 | 2.50 | 2.50 | 2.50 | 2.50 | 2.50 | 2.50 | 2.50 | 2.50 | 2.50 | 2.50 | 2.50 | 2.50 | 2.50 | 2.50 | 2.50 | 2.50 | |
| +4.25 | 2.75 | 2.75 | 2.75 | 2.75 | 2.75 | 2.75 | 2.75 | 2.75 | 2.75 | 2.75 | 2.75 | 2.75 | 2.75 | 2.75 | 2.75 | 2.75 | 2.75 | |
| +4.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | |
| +3.75 | 3.25 | 3.25 | 3.25 | 3.25 | 3.25 | 3.25 | 3.25 | 3.25 | 3.25 | 3.25 | 3.25 | 3.25 | 3.25 | 3.25 | 3.25 | 3.25 | 3.25 | 7.00BC |
| +3.50 | 3.50 | 3.50 | 3.50 | 3.50 | 3.50 | 3.50 | 3.50 | 3.50 | 3.50 | 3.50 | 3.50 | 3.50 | 3.50 | 3.50 | 3.50 | 3.50 | 3.50 | |
| +3.25 | 3.75 | 3.75 | 3.75 | 3.75 | 3.75 | 3.75 | 3.75 | 3.75 | 3.75 | 3.75 | 3.75 | 3.75 | 3.75 | 3.75 | 3.75 | 3.75 | 3.75 | |
| +3.00 | 4.00 | 4.00 | 4.00 | 4.00 | 4.00 | 4.00 | 4.00 | 4.00 | 4.00 | 4.00 | 4.00 | 4.00 | 4.00 | 4.00 | 4.00 | 4.00 | 4.00 | |
| +2.75 | 4.25 | 4.25 | 4.25 | 4.25 | 4.25 | 4.25 | 4.25 | 4.25 | 4.25 | 4.25 | 4.25 | 4.25 | 4.25 | 4.25 | 4.25 | 4.25 | 4.25 | |
| +2.50 | 4.50 | 4.50 | 4.50 | 4.50 | 4.50 | 4.50 | 4.50 | 4.50 | 4.50 | 4.50 | 4.50 | 4.50 | 4.50 | 4.50 | 4.50 | 4.50 | 4.50 | |
| +2.25 | 4.75 | 4.75 | 4.75 | 4.75 | 4.75 | 4.75 | 4.75 | 4.75 | 4.75 | 4.75 | 4.75 | 4.75 | 4.75 | 4.75 | 4.75 | 4.75 | 4.75 | |
| +2.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | |
| +1.75 | 3.25 | 3.25 | 3.25 | 3.25 | 3.25 | 3.25 | 3.25 | 3.25 | 3.25 | 3.25 | 3.25 | 3.25 | 3.25 | 3.25 | 3.25 | 3.25 | 3.25 | |
| +1.50 | 3.50 | 3.50 | 3.50 | 3.50 | 3.50 | 3.50 | 3.50 | 3.50 | 3.50 | 3.50 | 3.50 | 3.50 | 3.50 | 3.50 | 3.50 | 3.50 | 3.50 | |
| +1.25 | 3.75 | 3.75 | 3.75 | 3.75 | 3.75 | 3.75 | 3.75 | 3.75 | 3.75 | 3.75 | 3.75 | 3.75 | 3.75 | 3.75 | 3.75 | 3.75 | 3.75 | 5.00BC |
| +1.00 | 4.00 | 4.00 | 4.00 | 4.00 | 4.00 | 4.00 | 4.00 | 4.00 | 4.00 | 4.00 | 4.00 | 4.00 | 4.00 | 4.00 | 4.00 | 4.00 | 4.00 | |
| +0.75 | 4.25 | 4.25 | 4.25 | 4.25 | 4.25 | 4.25 | 4.25 | 4.25 | 4.25 | 4.25 | 4.25 | 4.25 | 4.25 | 4.25 | 4.25 | 4.25 | 4.25 | |
| +0.50 | 4.50 | 4.50 | 4.50 | 4.50 | 4.50 | 4.50 | 4.50 | 4.50 | 4.50 | 4.50 | 4.50 | 4.50 | 4.50 | 4.50 | 4.50 | 4.50 | 4.50 | |
| +0.25 | 4.75 | 4.75 | 4.75 | 4.75 | 4.75 | 4.75 | 4.75 | 4.75 | 4.75 | 4.75 | 4.75 | 4.75 | 4.75 | 4.75 | 4.75 | 4.75 | 4.75 | |
| +0.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | |
| -0.25 | 5.25 | 5.25 | 5.25 | 5.25 | 5.25 | 5.25 | 5.25 | 5.25 | 5.25 | 5.25 | 5.25 | 5.25 | 5.25 | 5.25 | 5.25 | 3.25 | 3.25 | |
| -0.50 | 5.50 | 5.50 | 5.50 | 5.50 | 5.50 | 5.50 | 5.50 | 5.50 | 5.50 | 5.50 | 5.50 | 5.50 | 5.50 | 3.50 | 3.50 | 3.50 | 3.50 | |
| -0.75 | 5.75 | 5.75 | 5.75 | 5.75 | 5.75 | 5.75 | 5.75 | 5.75 | 5.75 | 5.75 | 5.75 | 3.75 | 3.75 | 3.75 | 3.75 | 3.75 | 3.75 | |
| -1.00 | 6.00 | 6.00 | 6.00 | 6.00 | 6.00 | 6.00 | 6.00 | 4.00 | 4.00 | 4.00 | 4.00 | 4.00 | 4.00 | 4.00 | 4.00 | 4.00 | 4.00 | 3.00BC |
| -1.25 | 6.25 | 6.25 | 6.25 | 6.25 | 6.25 | 6.25 | 6.25 | 4.25 | 4.25 | 4.25 | 4.25 | 4.25 | 4.25 | 4.25 | 4.25 | 4.25 | 4.25 | |
| -1.50 | 6.50 | 6.50 | 6.50 | 6.50 | 6.50 | 4.50 | 4.50 | 4.50 | 4.50 | 4.50 | 4.50 | 4.50 | 4.50 | 4.50 | 4.50 | 4.50 | 4.50 | |
| -1.75 | 6.75 | 6.75 | 6.75 | 6.75 | 4.75 | 4.75 | 4.75 | 4.75 | 4.75 | 4.75 | 4.75 | 4.75 | 4.75 | 4.75 | 4.75 | 4.75 | 4.75 | |
| -2.00 | 7.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | |
| -2.25 | 5.25 | 5.25 | 5.25 | 5.25 | 5.25 | 5.25 | 5.25 | 5.25 | 5.25 | 5.25 | 5.25 | 5.25 | 5.25 | 5.25 | 5.25 | 5.25 | 3.25 | |
| -2.50 | 5.50 | 5.50 | 5.50 | 5.50 | 5.50 | 5.50 | 5.50 | 5.50 | 5.50 | 5.50 | 5.50 | 5.50 | 5.50 | 5.50 | 5.50 | 3.50 | 3.50 | |
| -2.75 | 5.75 | 5.75 | 5.75 | 5.75 | 5.75 | 5.75 | 5.75 | 5.75 | 5.75 | 5.75 | 5.75 | 5.75 | 5.75 | 5.75 | 3.75 | 3.75 | 3.75 | |
| -3.00 | 6.00 | 6.00 | 6.00 | 6.00 | 6.00 | 6.00 | 6.00 | 6.00 | 6.00 | 6.00 | 6.00 | 6.00 | 6.00 | 4.00 | 4.00 | 4.00 | 4.00 | |
| -3.25 | 6.25 | 6.25 | 6.25 | 6.25 | 6.25 | 6.25 | 6.25 | 6.25 | 6.25 | 6.25 | 6.25 | 6.25 | 4.25 | 4.25 | 4.25 | 4.25 | 4.25 | |
| -3.50 | 6.50 | 6.50 | 6.50 | 6.50 | 6.50 | 6.50 | 6.50 | 6.50 | 6.50 | 6.50 | 6.50 | 4.50 | 4.50 | 4.50 | 4.50 | 4.50 | 4.50 | |
| -3.75 | 6.75 | 6.75 | 6.75 | 6.75 | 6.75 | 6.75 | 6.75 | 6.75 | 6.75 | 6.75 | 4.75 | 4.75 | 4.75 | 4.75 | 4.75 | 4.75 | 4.75 | |
| -4.00 | 7.00 | 7.00 | 7.00 | 7.00 | 7.00 | 7.00 | 7.00 | 7.00 | 7.00 | 5.00 | 5.00 | 5.00 | 5.00 | 5.00 | 5.00 | 5.00 | 5.00 | 1.00BC |
| -4.25 | 7.25 | 7.25 | 7.25 | 7.25 | 7.25 | 7.25 | 7.25 | 7.25 | 5.25 | 5.25 | 5.25 | 5.25 | 5.25 | 5.25 | 5.25 | 5.25 | 5.25 | |
| -4.50 | 7.50 | 7.50 | 7.50 | 7.50 | 7.50 | 7.50 | 7.50 | 5.50 | 5.50 | 5.50 | 5.50 | 5.50 | 5.50 | 5.50 | 5.50 | 5.50 | 5.50 | |
| -4.75 | 7.75 | 7.75 | 7.75 | 7.75 | 7.75 | 7.75 | 5.75 | 5.75 | 5.75 | 5.75 | 5.75 | 5.75 | 5.75 | 5.75 | 5.75 | 5.75 | 5.75 | |
| -5.00 | 8.00 | 8.00 | 8.00 | 8.00 | 8.00 | 6.00 | 6.00 | 6.00 | 6.00 | 6.00 | 6.00 | 6.00 | 6.00 | 6.00 | 6.00 | 6.00 | 6.00 | |
| -5.25 | 8.25 | 8.25 | 8.25 | 8.25 | 6.25 | 6.25 | 6.25 | 6.25 | 6.25 | 6.25 | 6.25 | 6.25 | 6.25 | 6.25 | 6.25 | 6.25 | 6.25 | |
| -5.50 | 8.50 | 8.50 | 8.50 | 6.50 | 6.50 | 6.50 | 6.50 | 6.50 | 6.50 | 6.50 | 6.50 | 6.50 | 6.50 | 6.50 | 6.50 | 6.50 | 6.50 | |
| -5.75 | 8.75 | 8.75 | 6.75 | 6.75 | 6.75 | 6.75 | 6.75 | 6.75 | 6.75 | 6.75 | 6.75 | 6.75 | 6.75 | 6.75 | 6.75 | 6.75 | 6.75 | |
| -6.00 | 9.00 | 7.00 | 7.00 | 7.00 | 7.00 | 7.00 | 7.00 | 7.00 | 7.00 | 7.00 | 7.00 | 7.00 | 7.00 | 7.00 | 7.00 | 7.00 | 7.00 | |
| -6.25 | 7.25 | 7.25 | 7.25 | 7.25 | 7.25 | 7.25 | 7.25 | 7.25 | 7.25 | 7.25 | 7.25 | 7.25 | 7.25 | 7.25 | 7.25 | | | |
| -6.50 | 7.50 | 7.50 | 7.50 | 7.50 | 7.50 | 7.50 | 7.50 | 7.50 | 7.50 | 7.50 | 7.50 | 7.50 | 7.50 | 7.50 | | | | |
| -6.75 | 7.75 | 7.75 | 7.75 | 7.75 | 7.75 | 7.75 | 7.75 | 7.75 | 7.75 | 7.75 | 7.75 | 7.75 | 7.75 | | | | | |
| -7.00 | 8.00 | 8.00 | 8.00 | 8.00 | 8.00 | 8.00 | 8.00 | 8.00 | 8.00 | 8.00 | 8.00 | 8.00 | | | | | | |
| -7.25 | 8.25 | 8.25 | 8.25 | 8.25 | 8.25 | 8.25 | 8.25 | 8.25 | 8.25 | 8.25 | 8.25 | | | | | | | |
| -7.50 | 8.50 | 8.50 | 8.50 | 8.50 | 8.50 | 8.50 | 8.50 | 8.50 | 8.50 | 8.50 | | | | | | | | |
| -7.75 | 8.75 | 8.75 | 8.75 | 8.75 | 8.75 | 8.75 | 8.75 | 8.75 | 8.75 | | | | | | | | | |
| -8.00 | 9.00 | 9.00 | 9.00 | 9.00 | 9.00 | 9.00 | 9.00 | 9.00 | | | | | | | | | | |
| -8.25 | 9.25 | 9.25 | 9.25 | 9.25 | 9.25 | 9.25 | 9.25 | | | | | | | | | | | |
| -8.50 | 9.50 | 9.50 | 9.50 | 9.50 | 9.50 | 9.50 | | | | | | | | | | | | |
| -8.75 | 9.75 | 9.75 | 9.75 | 9.75 | 9.75 | | | | | | | | | | | | | |
| -9.00 | 10.00 | 10.00 | 10.00 | 10.00 | 10.00 | | | | | | | | | | | | | |
| -9.25 | 10.25 | 10.25 | 10.25 | 10.25 | | | | | | | | | | | | | | |
| -9.50 | 10.50 | 10.50 | 10.50 | | | | | | | | | | | | | | | |
| -9.75 | 10.75 | 10.75 | | | | | | | | | | | | | | | | |
| -10.00 | 11.00 | | | | | | | | | | | | | | | | | |

| SPH/CYL | 0.00 | -0.25 | -0.50 | -0.75 | -1.00 | -1.25 | -1.50 | -1.75 | -2.00 | -2.25 | -2.50 | -2.75 | -3.00 | -3.25 | -3.50 | -3.75 | -4.00 | |
|---|---|---|---|---|---|---|---|---|---|---|---|---|---|---|---|---|---|---|
| +8.00 | 1.00 | 1.25 | 1.50 | 1.75 | 2.00 | 2.25 | 2.50 | 2.75 | 3.00 | 3.25 | 3.50 | 3.75 | 4.00 | 4.25 | 4.50 | 4.75 | 5.00 | |
| +7.75 | 1.25 | 1.50 | 1.75 | 2.00 | 2.25 | 2.50 | 2.75 | 3.00 | 3.25 | 3.50 | 3.75 | 4.00 | 4.25 | 4.50 | 4.75 | 5.00 | 5.25 | |
| +7.50 | 1.50 | 1.75 | 2.00 | 2.25 | 2.50 | 2.75 | 3.00 | 3.25 | 3.50 | 3.75 | 4.00 | 4.25 | 4.50 | 4.75 | 5.00 | 5.25 | 5.50 | |
| +7.25 | 1.75 | 2.00 | 2.25 | 2.50 | 2.75 | 3.00 | 3.25 | 3.50 | 3.75 | 4.00 | 4.25 | 4.50 | 4.75 | 5.00 | 5.25 | 5.50 | 5.75 | |
| +7.00 | 2.00 | 2.25 | 2.50 | 2.75 | 3.00 | 3.25 | 3.50 | 3.75 | 4.00 | 4.25 | 4.50 | 4.75 | 5.00 | 5.25 | 5.50 | 5.75 | 6.00 | |
| +6.75 | 2.25 | 2.50 | 2.75 | 3.00 | 3.25 | 3.50 | 3.75 | 4.00 | 4.25 | 4.50 | 4.75 | 5.00 | 5.25 | 5.50 | 5.75 | 6.00 | 6.25 | 9.00BC |
| +6.50 | 2.50 | 2.75 | 3.00 | 3.25 | 3.50 | 3.75 | 4.00 | 4.25 | 4.50 | 4.75 | 5.00 | 5.25 | 5.50 | 5.75 | 6.00 | 6.25 | 6.50 | |
| +6.25 | 2.75 | 3.00 | 3.25 | 3.50 | 3.75 | 4.00 | 4.25 | 4.50 | 4.75 | 5.00 | 5.25 | 5.50 | 5.75 | 6.00 | 6.25 | 6.50 | 6.75 | |
| +6.00 | 3.00 | 3.25 | 3.50 | 3.75 | 4.00 | 4.25 | 4.50 | 4.75 | 5.00 | 5.25 | 5.50 | 5.75 | 6.00 | 6.25 | 6.50 | 6.75 | 7.00 | |
| +5.75 | 3.25 | 3.50 | 3.75 | 4.00 | 4.25 | 4.50 | 4.75 | 5.00 | 5.25 | 5.50 | 5.75 | 6.00 | 6.25 | 6.50 | 6.75 | 7.00 | 7.25 | |
| +5.50 | 3.50 | 3.75 | 4.00 | 4.25 | 4.50 | 4.75 | 5.00 | 5.25 | 5.50 | 5.75 | 6.00 | 6.25 | 6.50 | 6.75 | 7.00 | 7.25 | 7.50 | |
| +5.25 | 3.75 | 4.00 | 4.25 | 4.50 | 4.75 | 5.00 | 5.25 | 5.50 | 5.75 | 6.00 | 6.25 | 6.50 | 6.75 | 7.00 | 7.25 | 7.50 | 7.75 | |
| +5.00 | 2.00 | 2.25 | 2.50 | 2.75 | 3.00 | 3.25 | 3.50 | 3.75 | 4.00 | 4.25 | 4.50 | 4.75 | 5.00 | 5.25 | 5.50 | 5.75 | 6.00 | |
| +4.75 | 2.25 | 2.50 | 2.75 | 3.00 | 3.25 | 3.50 | 3.75 | 4.00 | 4.25 | 4.50 | 4.75 | 5.00 | 5.25 | 5.50 | 5.75 | 6.00 | 6.25 | |
| +4.50 | 2.50 | 2.75 | 3.00 | 3.25 | 3.50 | 3.75 | 4.00 | 4.25 | 4.50 | 4.75 | 5.00 | 5.25 | 5.50 | 5.75 | 6.00 | 6.25 | 6.50 | |
| +4.25 | 2.75 | 3.00 | 3.25 | 3.50 | 3.75 | 4.00 | 4.25 | 4.50 | 4.75 | 5.00 | 5.25 | 5.50 | 5.75 | 6.00 | 6.25 | 6.50 | 6.75 | |
| +4.00 | 3.00 | 3.25 | 3.50 | 3.75 | 4.00 | 4.25 | 4.50 | 4.75 | 5.00 | 5.25 | 5.50 | 5.75 | 6.00 | 6.25 | 6.50 | 6.75 | 7.00 | |
| +3.75 | 3.25 | 3.50 | 3.75 | 4.00 | 4.25 | 4.50 | 4.75 | 5.00 | 5.25 | 5.50 | 5.75 | 6.00 | 6.25 | 6.50 | 6.75 | 7.00 | 7.25 | 7.00BC |
| +3.50 | 3.50 | 3.75 | 4.00 | 4.25 | 4.50 | 4.75 | 5.00 | 5.25 | 5.50 | 5.75 | 6.00 | 6.25 | 6.50 | 6.75 | 7.00 | 7.25 | 7.50 | |
| +3.25 | 3.75 | 4.00 | 4.25 | 4.50 | 4.75 | 5.00 | 5.25 | 5.50 | 5.75 | 6.00 | 6.25 | 6.50 | 6.75 | 7.00 | 7.25 | 7.50 | 7.75 | |
| +3.00 | 4.00 | 4.25 | 4.50 | 4.75 | 5.00 | 5.25 | 5.50 | 5.75 | 6.00 | 6.25 | 6.50 | 6.75 | 7.00 | 7.25 | 7.50 | 7.75 | 8.00 | |
| +2.75 | 4.25 | 4.50 | 4.75 | 5.00 | 5.25 | 5.50 | 5.75 | 6.00 | 6.25 | 6.50 | 6.75 | 7.00 | 7.25 | 7.50 | 7.75 | 8.00 | 8.25 | |
| +2.50 | 4.50 | 4.75 | 5.00 | 5.25 | 5.50 | 5.75 | 6.00 | 6.25 | 6.50 | 6.75 | 7.00 | 7.25 | 7.50 | 7.75 | 8.00 | 8.25 | 8.50 | |
| +2.25 | 4.75 | 5.00 | 5.25 | 5.50 | 5.75 | 6.00 | 6.25 | 6.50 | 6.75 | 7.00 | 7.25 | 7.50 | 7.75 | 8.00 | 8.25 | 8.50 | 8.75 | |
| +2.00 | 3.00 | 3.25 | 3.50 | 3.75 | 4.00 | 4.25 | 4.50 | 4.75 | 5.00 | 5.25 | 5.50 | 5.75 | 6.00 | 6.25 | 6.50 | 6.75 | 7.00 | |
| +1.75 | 3.25 | 3.50 | 3.75 | 4.00 | 4.25 | 4.50 | 4.75 | 5.00 | 5.25 | 5.50 | 5.75 | 6.00 | 6.25 | 6.50 | 6.75 | 7.00 | 7.25 | |
| +1.50 | 3.50 | 3.75 | 4.00 | 4.25 | 4.50 | 4.75 | 5.00 | 5.25 | 5.50 | 5.75 | 6.00 | 6.25 | 6.50 | 6.75 | 7.00 | 7.25 | 7.50 | |
| +1.25 | 3.75 | 4.00 | 4.25 | 4.50 | 4.75 | 5.00 | 5.25 | 5.50 | 5.75 | 6.00 | 6.25 | 6.50 | 6.75 | 7.00 | 7.25 | 7.50 | 7.75 | |
| +1.00 | 4.00 | 4.25 | 4.50 | 4.75 | 5.00 | 5.25 | 5.50 | 5.75 | 6.00 | 6.25 | 6.50 | 6.75 | 7.00 | 7.25 | 7.50 | 7.75 | 8.00 | 5.00BC |
| +0.75 | 4.25 | 4.50 | 4.75 | 5.00 | 5.25 | 5.50 | 5.75 | 6.00 | 6.25 | 6.50 | 6.75 | 7.00 | 7.25 | 7.50 | 7.75 | 8.00 | 8.25 | |
| +0.50 | 4.50 | 4.75 | 5.00 | 5.25 | 5.50 | 5.75 | 6.00 | 6.25 | 6.50 | 6.75 | 7.00 | 7.25 | 7.50 | 7.75 | 8.00 | 8.25 | 8.50 | |
| +0.25 | 4.75 | 5.00 | 5.25 | 5.50 | 5.75 | 6.00 | 6.25 | 6.50 | 6.75 | 7.00 | 7.25 | 7.50 | 7.75 | 8.00 | 8.25 | 8.50 | 8.75 | |
| +0.00 | 5.00 | 5.25 | 5.50 | 5.75 | 6.00 | 6.25 | 6.50 | 6.75 | 7.00 | 7.25 | 7.50 | 7.75 | 8.00 | 8.25 | 8.50 | 8.75 | 9.00 | |
| -0.25 | 5.25 | 5.50 | 5.75 | 6.00 | 6.25 | 6.50 | 6.75 | 7.00 | 7.25 | 7.50 | 7.75 | 8.00 | 8.25 | 8.50 | 8.75 | 7.00 | 7.25 | |
| -0.50 | 5.50 | 5.75 | 6.00 | 6.25 | 6.50 | 6.75 | 7.00 | 7.25 | 7.50 | 7.75 | 8.00 | 8.25 | 8.50 | 6.75 | 7.00 | 7.25 | 7.50 | |
| -0.75 | 5.75 | 6.00 | 6.25 | 6.50 | 6.75 | 7.00 | 7.25 | 7.50 | 7.75 | 8.00 | 8.25 | 6.50 | 6.75 | 7.00 | 7.25 | 7.50 | 7.75 | |
| -1.00 | 6.00 | 6.25 | 6.50 | 6.75 | 7.00 | 7.25 | 7.50 | 7.75 | 8.00 | 6.25 | 6.50 | 6.75 | 7.00 | 7.25 | 7.50 | 7.75 | 8.00 | |
| -1.25 | 6.25 | 6.50 | 6.75 | 7.00 | 7.25 | 7.50 | 7.75 | 6.00 | 6.25 | 6.50 | 6.75 | 7.00 | 7.25 | 7.50 | 7.75 | 8.00 | 8.25 | 3.00BC |
| -1.50 | 6.50 | 6.75 | 7.00 | 7.25 | 7.50 | 5.75 | 6.00 | 6.25 | 6.50 | 6.75 | 7.00 | 7.25 | 7.50 | 7.75 | 8.00 | 8.25 | 8.50 | |
| -1.75 | 6.75 | 7.00 | 7.25 | 5.50 | 5.75 | 6.00 | 6.25 | 6.50 | 6.75 | 7.00 | 7.25 | 7.50 | 7.75 | 8.00 | 8.25 | 8.50 | 8.75 | |
| -2.00 | 7.00 | 5.25 | 5.50 | 5.75 | 6.00 | 6.25 | 6.50 | 6.75 | 7.00 | 7.25 | 7.50 | 7.75 | 8.00 | 8.25 | 8.50 | 8.75 | 9.00 | |
| -2.25 | 5.25 | 5.50 | 5.75 | 6.00 | 6.25 | 6.50 | 6.75 | 7.00 | 7.25 | 7.50 | 7.75 | 8.00 | 8.25 | 8.50 | 8.75 | 9.00 | 7.25 | |
| -2.50 | 5.50 | 5.75 | 6.00 | 6.25 | 6.50 | 6.75 | 7.00 | 7.25 | 7.50 | 7.75 | 8.00 | 8.25 | 8.50 | 8.75 | 9.00 | 7.25 | 7.50 | |
| -2.75 | 5.75 | 6.00 | 6.25 | 6.50 | 6.75 | 7.00 | 7.25 | 7.50 | 7.75 | 8.00 | 8.25 | 8.50 | 8.75 | 9.00 | 7.25 | 7.50 | 7.75 | |
| -3.00 | 6.00 | 6.25 | 6.50 | 6.75 | 7.00 | 7.25 | 7.50 | 7.75 | 8.00 | 8.25 | 8.50 | 8.75 | 9.00 | 7.25 | 7.50 | 7.75 | 8.00 | |
| -3.25 | 6.25 | 6.50 | 6.75 | 7.00 | 7.25 | 7.50 | 7.75 | 8.00 | 8.25 | 8.50 | 8.75 | 9.00 | 7.25 | 7.50 | 7.75 | 8.00 | 8.25 | |
| -3.50 | 6.50 | 6.75 | 7.00 | 7.25 | 7.50 | 7.75 | 8.00 | 8.25 | 8.50 | 8.75 | 9.00 | 7.25 | 7.50 | 7.75 | 8.00 | 8.25 | 8.50 | |
| -3.75 | 6.75 | 7.00 | 7.25 | 7.50 | 7.75 | 8.00 | 8.25 | 8.50 | 8.75 | 9.00 | 7.25 | 7.50 | 7.75 | 8.00 | 8.25 | 8.50 | 8.75 | |
| -4.00 | 7.00 | 7.25 | 7.50 | 7.75 | 8.00 | 8.25 | 8.50 | 8.75 | 9.00 | 7.25 | 7.50 | 7.75 | 8.00 | 8.25 | 8.50 | 8.75 | 9.00 | 1.00BC |
| -4.25 | 7.25 | 7.50 | 7.75 | 8.00 | 8.25 | 8.50 | 8.75 | 9.00 | 7.25 | 7.50 | 7.75 | 8.00 | 8.25 | 8.50 | 8.75 | 9.00 | 9.25 | |
| -4.50 | 7.50 | 7.75 | 8.00 | 8.25 | 8.50 | 8.75 | 9.00 | 7.25 | 7.50 | 7.75 | 8.00 | 8.25 | 8.50 | 8.75 | 9.00 | 9.25 | 9.50 | |
| -4.75 | 7.75 | 8.00 | 8.25 | 8.50 | 8.75 | 9.00 | 7.25 | 7.50 | 7.75 | 8.00 | 8.25 | 8.50 | 8.75 | 9.00 | 9.25 | 9.50 | 9.75 | |
| -5.00 | 8.00 | 8.25 | 8.50 | 8.75 | 9.00 | 7.25 | 7.50 | 7.75 | 8.00 | 8.25 | 8.50 | 8.75 | 9.00 | 9.25 | 9.50 | 9.75 | 10.00 | |
| -5.25 | 8.25 | 8.50 | 8.75 | 9.00 | 7.25 | 7.50 | 7.75 | 8.00 | 8.25 | 8.50 | 8.75 | 9.00 | 9.25 | 9.50 | 9.75 | 10.00 | 10.25 | |
| -5.50 | 8.50 | 8.75 | 9.00 | 7.25 | 7.50 | 7.75 | 8.00 | 8.25 | 8.50 | 8.75 | 9.00 | 9.25 | 9.50 | 9.75 | 10.00 | 10.25 | 10.50 | |
| -5.75 | 8.75 | 9.00 | 7.25 | 7.50 | 7.75 | 8.00 | 8.25 | 8.50 | 8.75 | 9.00 | 9.25 | 9.50 | 9.75 | 10.00 | 10.25 | 10.50 | 10.75 | |
| -6.00 | 9.00 | 7.25 | 7.50 | 7.75 | 8.00 | 8.25 | 8.50 | 8.75 | 9.00 | 9.25 | 9.50 | 9.75 | 10.00 | 10.25 | 10.50 | 10.75 | 11.00 | |
| -6.25 | 7.25 | 7.50 | 7.75 | 8.00 | 8.25 | 8.50 | 8.75 | 9.00 | 9.25 | 9.50 | 9.75 | 10.00 | 10.25 | 10.50 | 10.75 | 11.00 | | |
| -6.50 | 7.50 | 7.75 | 8.00 | 8.25 | 8.50 | 8.75 | 9.00 | 9.25 | 9.50 | 9.75 | 10.00 | 10.25 | 10.50 | 10.75 | 11.00 | | | |
| -6.75 | 7.75 | 8.00 | 8.25 | 8.50 | 8.75 | 9.00 | 9.25 | 9.50 | 9.75 | 10.00 | 10.25 | 10.50 | 10.75 | 11.00 | | | | |
| -7.00 | 8.00 | 8.25 | 8.50 | 8.75 | 9.00 | 9.25 | 9.50 | 9.75 | 10.00 | 10.25 | 10.50 | 10.75 | 11.00 | | | | | |
| -7.25 | 8.25 | 8.50 | 8.75 | 9.00 | 9.25 | 9.50 | 9.75 | 10.00 | 10.25 | 10.50 | 10.75 | 11.00 | | | | | | |
| -7.50 | 8.50 | 8.75 | 9.00 | 9.25 | 9.50 | 9.75 | 10.00 | 10.25 | 10.50 | 10.75 | 11.00 | | | | | | | |
| -7.75 | 8.75 | 9.00 | 9.25 | 9.50 | 9.75 | 10.00 | 10.25 | 10.50 | 10.75 | 11.00 | | | | | | | | |
| -8.00 | 9.00 | 9.25 | 9.50 | 9.75 | 10.00 | 10.25 | 10.50 | 10.75 | 11.00 | | | | | | | | | |
| -8.25 | 9.25 | 9.50 | 9.75 | 10.00 | 10.25 | 10.50 | 10.75 | 11.00 | | | | | | | | | | |
| -8.50 | 9.50 | 9.75 | 10.00 | 10.25 | 10.50 | 10.75 | 11.00 | | | | | | | | | | | |
| -8.75 | 9.75 | 10.00 | 10.25 | 10.50 | 10.75 | 11.00 | | | | | | | | | | | | |
| -9.00 | 10.00 | 10.25 | 10.50 | 10.75 | 11.00 | | | | | | | | | | | | | |
| -9.25 | 10.25 | 10.50 | 10.75 | 11.00 | | | | | | | | | | | | | | |
| -9.50 | 10.50 | 10.75 | 11.00 | | | | | | | | | | | | | | | |
| -9.75 | 10.75 | 11.00 | | | | | | | | | | | | | | | | |
| -10.00 | 11.00 | | | | | | | | | | | | | | | | | |

FIG. 13

| D2 / CYL | 0.00 | -0.25 | -0.50 | -0.75 | -1.00 | -1.25 | -1.50 | -1.75 | -2.00 | -2.25 | -2.50 | -2.75 | -3.00 | -3.25 | -3.50 | -3.75 | -4.00 |
|---|---|---|---|---|---|---|---|---|---|---|---|---|---|---|---|---|---|
| 1.00 | 1.00 | 1.25 | 1.50 | 1.75 | 2.00 | 2.25 | 2.50 | 2.75 | 3.00 | 3.25 | 3.50 | 3.75 | 4.00 | 4.25 | 4.50 | 4.75 | 5.00 |
| 1.25 | 1.25 | 1.50 | 1.75 | 2.00 | 2.25 | 2.50 | 2.75 | 3.00 | 3.25 | 3.50 | 3.75 | 4.00 | 4.25 | 4.50 | 4.75 | 5.00 | 5.25 |
| 1.50 | 1.50 | 1.75 | 2.00 | 2.25 | 2.50 | 2.75 | 3.00 | 3.25 | 3.50 | 3.75 | 4.00 | 4.25 | 4.50 | 4.75 | 5.00 | 5.25 | 5.50 |
| 1.75 | 1.75 | 2.00 | 2.25 | 2.50 | 2.75 | 3.00 | 3.25 | 3.50 | 3.75 | 4.00 | 4.25 | 4.50 | 4.75 | 5.00 | 5.25 | 5.50 | 5.75 |
| 2.00 | 2.00 | 2.25 | 2.50 | 2.75 | 3.00 | 3.25 | 3.50 | 3.75 | 4.00 | 4.25 | 4.50 | 4.75 | 5.00 | 5.25 | 5.50 | 5.75 | 6.00 |
| 2.25 | 2.25 | 2.50 | 2.75 | 3.00 | 3.25 | 3.50 | 3.75 | 4.00 | 4.25 | 4.50 | 4.75 | 5.00 | 5.25 | 5.50 | 5.75 | 6.00 | 6.25 |
| 2.50 | 2.50 | 2.75 | 3.00 | 3.25 | 3.50 | 3.75 | 4.00 | 4.25 | 4.50 | 4.75 | 5.00 | 5.25 | 5.50 | 5.75 | 6.00 | 6.25 | 6.50 |
| 2.75 | 2.75 | 3.00 | 3.25 | 3.50 | 3.75 | 4.00 | 4.25 | 4.50 | 4.75 | 5.00 | 5.25 | 5.50 | 5.75 | 6.00 | 6.25 | 6.50 | 6.75 |
| 3.00 | 3.00 | 3.25 | 3.50 | 3.75 | 4.00 | 4.25 | 4.50 | 4.75 | 5.00 | 5.25 | 5.50 | 5.75 | 6.00 | 6.25 | 6.50 | 6.75 | 7.00 |
| 3.25 | 3.25 | 3.50 | 3.75 | 4.00 | 4.25 | 4.50 | 4.75 | 5.00 | 5.25 | 5.50 | 5.75 | 6.00 | 6.25 | 6.50 | 6.75 | 7.00 | 7.25 |
| 3.50 | 3.50 | 3.75 | 4.00 | 4.25 | 4.50 | 4.75 | 5.00 | 5.25 | 5.50 | 5.75 | 6.00 | 6.25 | 6.50 | 6.75 | 7.00 | 7.25 | 7.50 |
| 3.75 | 3.75 | 4.00 | 4.25 | 4.50 | 4.75 | 5.00 | 5.25 | 5.50 | 5.75 | 6.00 | 6.25 | 6.50 | 6.75 | 7.00 | 7.25 | 7.50 | 7.75 |
| 4.00 | 4.00 | 4.25 | 4.50 | 4.75 | 5.00 | 5.25 | 5.50 | 5.75 | 6.00 | 6.25 | 6.50 | 6.75 | 7.00 | 7.25 | 7.50 | 7.75 | 8.00 |
| 4.25 | 4.25 | 4.50 | 4.75 | 5.00 | 5.25 | 5.50 | 5.75 | 6.00 | 6.25 | 6.50 | 6.75 | 7.00 | 7.25 | 7.50 | 7.75 | 8.00 | 8.25 |
| 4.50 | 4.50 | 4.75 | 5.00 | 5.25 | 5.50 | 5.75 | 6.00 | 6.25 | 6.50 | 6.75 | 7.00 | 7.25 | 7.50 | 7.75 | 8.00 | 8.25 | 8.50 |
| 4.75 | 4.75 | 5.00 | 5.25 | 5.50 | 5.75 | 6.00 | 6.25 | 6.50 | 6.75 | 7.00 | 7.25 | 7.50 | 7.75 | 8.00 | 8.25 | 8.50 | 8.75 |
| 5.00 | 5.00 | 5.25 | 5.50 | 5.75 | 6.00 | 6.25 | 6.50 | 6.75 | 7.00 | 7.25 | 7.50 | 7.75 | 8.00 | 8.25 | 8.50 | 8.75 | 9.00 |
| 5.25 | 5.25 | 5.50 | 5.75 | 6.00 | 6.25 | 6.50 | 6.75 | 7.00 | 7.25 | 7.50 | 7.75 | 8.00 | 8.25 | 8.50 | 8.75 | 9.00 | 9.25 |
| 5.50 | 5.50 | 5.75 | 6.00 | 6.25 | 6.50 | 6.75 | 7.00 | 7.25 | 7.50 | 7.75 | 8.00 | 8.25 | 8.50 | 8.75 | 9.00 | 9.25 | 9.50 |
| 5.75 | 5.75 | 6.00 | 6.25 | 6.50 | 6.75 | 7.00 | 7.25 | 7.50 | 7.75 | 8.00 | 8.25 | 8.50 | 8.75 | 9.00 | 9.25 | 9.50 | 9.75 |
| 6.00 | 6.00 | 6.25 | 6.50 | 6.75 | 7.00 | 7.25 | 7.50 | 7.75 | 8.00 | 8.25 | 8.50 | 8.75 | 9.00 | 9.25 | 9.50 | 9.75 | 10.00 |
| 6.25 | 6.25 | 6.50 | 6.75 | 7.00 | 7.25 | 7.50 | 7.75 | 8.00 | 8.25 | 8.50 | 8.75 | 9.00 | 9.25 | 9.50 | 9.75 | 10.00 | 10.25 |
| 6.50 | 6.50 | 6.75 | 7.00 | 7.25 | 7.50 | 7.75 | 8.00 | 8.25 | 8.50 | 8.75 | 9.00 | 9.25 | 9.50 | 9.75 | 10.00 | 10.25 | 10.50 |
| 6.75 | 6.75 | 7.00 | 7.25 | 7.50 | 7.75 | 8.00 | 8.25 | 8.50 | 8.75 | 9.00 | 9.25 | 9.50 | 9.75 | 10.00 | 10.25 | 10.50 | 10.75 |
| 7.00 | 7.00 | 7.25 | 7.50 | 7.75 | 8.00 | 8.25 | 8.50 | 8.75 | 9.00 | 9.25 | 9.50 | 9.75 | 10.00 | 10.25 | 10.50 | 10.75 | 11.00 |
| 7.25 | 7.25 | 7.50 | 7.75 | 8.00 | 8.25 | 8.50 | 8.75 | 9.00 | 9.25 | 9.50 | 9.75 | 10.00 | 10.25 | 10.50 | 10.75 | 11.00 | |
| 7.50 | 7.50 | 7.75 | 8.00 | 8.25 | 8.50 | 8.75 | 9.00 | 9.25 | 9.50 | 9.75 | 10.00 | 10.25 | 10.50 | 10.75 | 11.00 | | |
| 7.75 | 7.75 | 8.00 | 8.25 | 8.50 | 8.75 | 9.00 | 9.25 | 9.50 | 9.75 | 10.00 | 10.25 | 10.50 | 10.75 | 11.00 | | | |
| 8.00 | 8.00 | 8.25 | 8.50 | 8.75 | 9.00 | 9.25 | 9.50 | 9.75 | 10.00 | 10.25 | 10.50 | 10.75 | 11.00 | | | | |
| 8.25 | 8.25 | 8.50 | 8.75 | 9.00 | 9.25 | 9.50 | 9.75 | 10.00 | 10.25 | 10.50 | 10.75 | 11.00 | | | | | |
| 8.50 | 8.50 | 8.75 | 9.00 | 9.25 | 9.50 | 9.75 | 10.00 | 10.25 | 10.50 | 10.75 | 11.00 | | | | | | |
| 8.75 | 8.75 | 9.00 | 9.25 | 9.50 | 9.75 | 10.00 | 10.25 | 10.50 | 10.75 | 11.00 | | | | | | | |
| 9.00 | 9.00 | 9.25 | 9.50 | 9.75 | 10.00 | 10.25 | 10.50 | 10.75 | 11.00 | | | | | | | | |
| 9.25 | 9.25 | 9.50 | 9.75 | 10.00 | 10.25 | 10.50 | 10.75 | 11.00 | | | | | | | | | |
| 9.50 | 9.50 | 9.75 | 10.00 | 10.25 | 10.50 | 10.75 | 11.00 | | | | | | | | | | |
| 9.75 | 9.75 | 10.00 | 10.25 | 10.50 | 10.75 | 11.00 | | | | | | | | | | | |
| 10.00 | 10.00 | 10.25 | 10.50 | 10.75 | 11.00 | | | | | | | | | | | | |
| 10.25 | 10.25 | 10.50 | 10.75 | 11.00 | | | | | | | | | | | | | |
| 10.50 | 10.50 | 10.75 | 11.00 | | | | | | | | | | | | | | |
| 10.75 | 10.75 | 11.00 | | | | | | | | | | | | | | | |
| 11.00 | 11.00 | | | | | | | | | | | | | | | | |

FIG. 14

| SPH / CYL | 0.00 | -0.25 | -0.50 | -0.75 | -1.00 | -1.25 | -1.50 | -1.75 | -2.00 | -2.25 | -2.50 | -2.75 | -3.00 | -3.25 | -3.50 | -3.75 | -4.00 |
|---|---|---|---|---|---|---|---|---|---|---|---|---|---|---|---|---|---|
| +8.00 | 9.00 | 9.00 | 9.00 | 9.00 | 9.00 | 9.00 | 9.00 | 9.00 | 9.00 | 9.00 | 9.00 | 9.00 | 9.00 | 9.00 | 9.00 | 9.00 | 9.00 |
| +7.75 | 8.75 | 8.75 | 8.75 | 8.75 | 8.75 | 8.75 | 8.75 | 8.75 | 8.75 | 8.75 | 8.75 | 8.75 | 8.75 | 8.75 | 8.75 | 8.75 | 8.75 |
| +7.50 | 8.50 | 8.50 | 8.50 | 8.50 | 8.50 | 8.50 | 8.50 | 8.50 | 8.50 | 8.50 | 8.50 | 8.50 | 8.50 | 8.50 | 8.50 | 8.50 | 8.50 |
| +7.25 | 8.25 | 8.25 | 8.25 | 8.25 | 8.25 | 8.25 | 8.25 | 8.25 | 8.25 | 8.25 | 8.25 | 8.25 | 8.25 | 8.25 | 8.25 | 8.25 | 8.25 |
| +7.00 | 9.00 | 9.00 | 9.00 | 9.00 | 9.00 | 9.00 | 9.00 | 9.00 | 9.00 | 9.00 | 9.00 | 9.00 | 9.00 | 9.00 | 9.00 | 9.00 | 9.00 |
| +6.75 | 8.75 | 8.75 | 8.75 | 8.75 | 8.75 | 8.75 | 8.75 | 8.75 | 8.75 | 8.75 | 8.75 | 8.75 | 8.75 | 8.75 | 8.75 | 8.75 | 8.75 |
| +6.50 | 8.50 | 8.50 | 8.50 | 8.50 | 8.50 | 8.50 | 8.50 | 8.50 | 8.50 | 8.50 | 8.50 | 8.50 | 8.50 | 8.50 | 8.50 | 8.50 | 8.50 |
| +6.25 | 8.25 | 8.25 | 8.25 | 8.25 | 8.25 | 8.25 | 8.25 | 8.25 | 8.25 | 8.25 | 8.25 | 8.25 | 8.25 | 8.25 | 8.25 | 8.25 | 8.25 |
| +6.00 | 9.00 | 9.00 | 9.00 | 9.00 | 9.00 | 9.00 | 9.00 | 9.00 | 9.00 | 9.00 | 9.00 | 9.00 | 9.00 | 9.00 | 9.00 | 9.00 | 9.00 |
| +5.75 | 8.75 | 8.75 | 8.75 | 8.75 | 8.75 | 8.75 | 8.75 | 8.75 | 8.75 | 8.75 | 8.75 | 8.75 | 8.75 | 8.75 | 8.75 | 8.75 | 8.75 |
| +5.50 | 8.50 | 8.50 | 8.50 | 8.50 | 8.50 | 8.50 | 8.50 | 8.50 | 8.50 | 8.50 | 8.50 | 8.50 | 8.50 | 8.50 | 8.50 | 8.50 | 8.50 |
| +5.25 | 8.25 | 8.25 | 8.25 | 8.25 | 8.25 | 8.25 | 8.25 | 8.25 | 8.25 | 8.25 | 8.25 | 8.25 | 8.25 | 8.25 | 8.25 | 8.25 | 8.25 |
| +5.00 | 7.00 | 7.00 | 7.00 | 7.00 | 7.00 | 7.00 | 7.00 | 7.00 | 7.00 | 7.00 | 7.00 | 7.00 | 7.00 | 7.00 | 7.00 | 7.00 | 7.00 |
| +4.75 | 6.75 | 6.75 | 6.75 | 6.75 | 6.75 | 6.75 | 6.75 | 6.75 | 6.75 | 6.75 | 6.75 | 6.75 | 6.75 | 6.75 | 6.75 | 6.75 | 6.75 |
| +4.50 | 6.50 | 6.50 | 6.50 | 6.50 | 6.50 | 6.50 | 6.50 | 6.50 | 6.50 | 6.50 | 6.50 | 6.50 | 6.50 | 6.50 | 6.50 | 6.50 | 6.50 |
| +4.25 | 6.25 | 6.25 | 6.25 | 6.25 | 6.25 | 6.25 | 6.25 | 6.25 | 6.25 | 6.25 | 6.25 | 6.25 | 6.25 | 6.25 | 6.25 | 6.25 | 6.25 |
| +4.00 | 7.00 | 7.00 | 7.00 | 7.00 | 7.00 | 7.00 | 7.00 | 7.00 | 7.00 | 7.00 | 7.00 | 7.00 | 7.00 | 7.00 | 7.00 | 7.00 | 7.00 |
| +3.75 | 6.75 | 6.75 | 6.75 | 6.75 | 6.75 | 6.75 | 6.75 | 6.75 | 6.75 | 6.75 | 6.75 | 6.75 | 6.75 | 6.75 | 6.75 | 6.75 | 6.75 |
| +3.50 | 6.50 | 6.50 | 6.50 | 6.50 | 6.50 | 6.50 | 6.50 | 6.50 | 6.50 | 6.50 | 6.50 | 6.50 | 6.50 | 6.50 | 6.50 | 6.50 | 6.50 |
| +3.25 | 6.25 | 6.25 | 6.25 | 6.25 | 6.25 | 6.25 | 6.25 | 6.25 | 6.25 | 6.25 | 6.25 | 6.25 | 6.25 | 6.25 | 6.25 | 6.25 | 6.25 |
| +3.00 | 7.00 | 7.00 | 7.00 | 7.00 | 7.00 | 7.00 | 7.00 | 7.00 | 7.00 | 7.00 | 7.00 | 7.00 | 7.00 | 7.00 | 7.00 | 7.00 | 7.00 |
| +2.75 | 6.75 | 6.75 | 6.75 | 6.75 | 6.75 | 6.75 | 6.75 | 6.75 | 6.75 | 6.75 | 6.75 | 6.75 | 6.75 | 6.75 | 6.75 | 6.75 | 6.75 |
| +2.50 | 6.50 | 6.50 | 6.50 | 6.50 | 6.50 | 6.50 | 6.50 | 6.50 | 6.50 | 6.50 | 6.50 | 6.50 | 6.50 | 6.50 | 6.50 | 6.50 | 6.50 |
| +2.25 | 6.25 | 6.25 | 6.25 | 6.25 | 6.25 | 6.25 | 6.25 | 6.25 | 6.25 | 6.25 | 6.25 | 6.25 | 6.25 | 6.25 | 6.25 | 6.25 | 6.25 |
| +2.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| +1.75 | 4.75 | 4.75 | 4.75 | 4.75 | 4.75 | 4.75 | 4.75 | 4.75 | 4.75 | 4.75 | 4.75 | 4.75 | 4.75 | 4.75 | 4.75 | 4.75 | 4.75 |
| +1.50 | 4.50 | 4.50 | 4.50 | 4.50 | 4.50 | 4.50 | 4.50 | 4.50 | 4.50 | 4.50 | 4.50 | 4.50 | 4.50 | 4.50 | 4.50 | 4.50 | 4.50 |
| +1.25 | 4.25 | 4.25 | 4.25 | 4.25 | 4.25 | 4.25 | 4.25 | 4.25 | 4.25 | 4.25 | 4.25 | 4.25 | 4.25 | 4.25 | 4.25 | 4.25 | 4.25 |
| +1.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| +0.75 | 4.75 | 4.75 | 4.75 | 4.75 | 4.75 | 4.75 | 4.75 | 4.75 | 4.75 | 4.75 | 4.75 | 4.75 | 4.75 | 4.75 | 4.75 | 4.75 | 4.75 |
| +0.50 | 4.50 | 4.50 | 4.50 | 4.50 | 4.50 | 4.50 | 4.50 | 4.50 | 4.50 | 4.50 | 4.50 | 4.50 | 4.50 | 4.50 | 4.50 | 4.50 | 4.50 |
| +0.25 | 4.25 | 4.25 | 4.25 | 4.25 | 4.25 | 4.25 | 4.25 | 4.25 | 4.25 | 4.25 | 4.25 | 4.25 | 4.25 | 4.25 | 4.25 | 4.25 | 4.25 |
| +0.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| -0.25 | 5.75 | 5.75 | 5.75 | 5.75 | 5.75 | 5.75 | 5.75 | 5.75 | 5.75 | 5.75 | 5.75 | 5.75 | 5.75 | 5.75 | 5.75 | 3.75 | 3.75 |
| -0.50 | 5.50 | 5.50 | 5.50 | 5.50 | 5.50 | 5.50 | 5.50 | 5.50 | 5.50 | 5.50 | 5.50 | 5.50 | 5.50 | 3.50 | 3.50 | 3.50 | 3.50 |
| -0.75 | 5.25 | 5.25 | 5.25 | 5.25 | 5.25 | 5.25 | 5.25 | 5.25 | 5.25 | 5.25 | 5.25 | 3.25 | 3.25 | 3.25 | 3.25 | 3.25 | 3.25 |
| -1.00 | 5.00 | 5.00 | 5.00 | 5.00 | 5.00 | 5.00 | 5.00 | 5.00 | 5.00 | 3.00 | 3.00 | 3.00 | 3.00 | 3.00 | 3.00 | 3.00 | 3.00 |
| -1.25 | 5.75 | 5.75 | 5.75 | 5.75 | 5.75 | 5.75 | 5.75 | 3.75 | 3.75 | 3.75 | 3.75 | 3.75 | 3.75 | 3.75 | 3.75 | 3.75 | 3.75 |
| -1.50 | 5.50 | 5.50 | 5.50 | 5.50 | 5.50 | 3.50 | 3.50 | 3.50 | 3.50 | 3.50 | 3.50 | 3.50 | 3.50 | 3.50 | 3.50 | 3.50 | 3.50 |
| -1.75 | 5.25 | 5.25 | 5.25 | 3.25 | 3.25 | 3.25 | 3.25 | 3.25 | 3.25 | 3.25 | 3.25 | 3.25 | 3.25 | 3.25 | 3.25 | 3.25 | 3.25 |
| -2.00 | 5.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 |
| -2.25 | 3.75 | 3.75 | 3.75 | 3.75 | 3.75 | 3.75 | 3.75 | 3.75 | 3.75 | 3.75 | 3.75 | 3.75 | 3.75 | 3.75 | 3.75 | 3.75 | 1.75 |
| -2.50 | 3.50 | 3.50 | 3.50 | 3.50 | 3.50 | 3.50 | 3.50 | 3.50 | 3.50 | 3.50 | 3.50 | 3.50 | 3.50 | 3.50 | 3.50 | 1.50 | 1.50 |
| -2.75 | 3.25 | 3.25 | 3.25 | 3.25 | 3.25 | 3.25 | 3.25 | 3.25 | 3.25 | 3.25 | 3.25 | 3.25 | 3.25 | 1.25 | 1.25 | 1.25 | 1.25 |
| -3.00 | 3.00 | 3.00 | 3.00 | 3.00 | 3.00 | 3.00 | 3.00 | 3.00 | 3.00 | 3.00 | 3.00 | 3.00 | 3.00 | 1.00 | 1.00 | 1.00 | 1.00 |
| -3.25 | 3.75 | 3.75 | 3.75 | 3.75 | 3.75 | 3.75 | 3.75 | 3.75 | 3.75 | 3.75 | 3.75 | 3.75 | 1.75 | 1.75 | 1.75 | 1.75 | 1.75 |
| -3.50 | 3.50 | 3.50 | 3.50 | 3.50 | 3.50 | 3.50 | 3.50 | 3.50 | 3.50 | 3.50 | 3.50 | 1.50 | 1.50 | 1.50 | 1.50 | 1.50 | 1.50 |
| -3.75 | 3.25 | 3.25 | 3.25 | 3.25 | 3.25 | 3.25 | 3.25 | 3.25 | 3.25 | 3.25 | 1.25 | 1.25 | 1.25 | 1.25 | 1.25 | 1.25 | 1.25 |
| -4.00 | 3.00 | 3.00 | 3.00 | 3.00 | 3.00 | 3.00 | 3.00 | 3.00 | 3.00 | 1.00 | 1.00 | 1.00 | 1.00 | 1.00 | 1.00 | 1.00 | 1.00 |
| -4.25 | 3.75 | 3.75 | 3.75 | 3.75 | 3.75 | 3.75 | 3.75 | 3.75 | 3.75 | 1.75 | 1.75 | 1.75 | 1.75 | 1.75 | 1.75 | 1.75 | 1.75 |
| -4.50 | 3.50 | 3.50 | 3.50 | 3.50 | 3.50 | 3.50 | 3.50 | 1.50 | 1.50 | 1.50 | 1.50 | 1.50 | 1.50 | 1.50 | 1.50 | 1.50 | 1.50 |
| -4.75 | 3.25 | 3.25 | 3.25 | 3.25 | 3.25 | 3.25 | 1.25 | 1.25 | 1.25 | 1.25 | 1.25 | 1.25 | 1.25 | 1.25 | 1.25 | 1.25 | 1.25 |
| -5.00 | 3.00 | 3.00 | 3.00 | 3.00 | 3.00 | 1.00 | 1.00 | 1.00 | 1.00 | 1.00 | 1.00 | 1.00 | 1.00 | 1.00 | 1.00 | 1.00 | 1.00 |
| -5.25 | 3.75 | 3.75 | 3.75 | 3.75 | 1.75 | 1.75 | 1.75 | 1.75 | 1.75 | 1.75 | 1.75 | 1.75 | 1.75 | 1.75 | 1.75 | 1.75 | |
| -5.50 | 3.50 | 3.50 | 3.50 | 1.50 | 1.50 | 1.50 | 1.50 | 1.50 | 1.50 | 1.50 | 1.50 | 1.50 | 1.50 | 1.50 | 1.50 | | |
| -5.75 | 3.25 | 3.25 | 1.25 | 1.25 | 1.25 | 1.25 | 1.25 | 1.25 | 1.25 | 1.25 | 1.25 | 1.25 | 1.25 | 1.25 | | | |
| -6.00 | 3.00 | 1.00 | 1.00 | 1.00 | 1.00 | 1.00 | 1.00 | 1.00 | 1.00 | 1.00 | 1.00 | 1.00 | 1.00 | 1.00 | | | |
| -6.25 | 1.75 | 1.75 | 1.75 | 1.75 | 1.75 | 1.75 | 1.75 | 1.75 | 1.75 | 1.75 | 1.75 | 1.75 | 1.75 | 1.75 | | | |
| -6.50 | 1.50 | 1.50 | 1.50 | 1.50 | 1.50 | 1.50 | 1.50 | 1.50 | 1.50 | 1.50 | 1.50 | 1.50 | 1.50 | | | | |
| -6.75 | 1.25 | 1.25 | 1.25 | 1.25 | 1.25 | 1.25 | 1.25 | 1.25 | 1.25 | 1.25 | 1.25 | 1.25 | | | | | |
| -7.00 | 1.00 | 1.00 | 1.00 | 1.00 | 1.00 | 1.00 | 1.00 | 1.00 | 1.00 | 1.00 | 1.00 | | | | | | |
| -7.25 | 1.75 | 1.75 | 1.75 | 1.75 | 1.75 | 1.75 | 1.75 | 1.75 | 1.75 | 1.75 | 1.75 | | | | | | |
| -7.50 | 1.50 | 1.50 | 1.50 | 1.50 | 1.50 | 1.50 | 1.50 | 1.50 | 1.50 | 1.50 | | | | | | | |
| -7.75 | 1.25 | 1.25 | 1.25 | 1.25 | 1.25 | 1.25 | 1.25 | 1.25 | 1.25 | | | | | | | | |
| -8.00 | 1.00 | 1.00 | 1.00 | 1.00 | 1.00 | 1.00 | 1.00 | 1.00 | 1.00 | | | | | | | | |
| -8.25 | 1.75 | 1.75 | 1.75 | 1.75 | 1.75 | 1.75 | 1.75 | 1.75 | | | | | | | | | |
| -8.50 | 1.50 | 1.50 | 1.50 | 1.50 | 1.50 | 1.50 | 1.50 | | | | | | | | | | |
| -8.75 | 1.25 | 1.25 | 1.25 | 1.25 | 1.25 | 1.25 | | | | | | | | | | | |
| -9.00 | 1.00 | 1.00 | 1.00 | 1.00 | 1.00 | | | | | | | | | | | | |
| -9.25 | 1.75 | 1.75 | 1.75 | 1.75 | | | | | | | | | | | | | |
| -9.50 | 1.50 | 1.50 | 1.50 | | | | | | | | | | | | | | |
| -9.75 | 1.25 | 1.25 | | | | | | | | | | | | | | | |
| -10.00 | 1.00 | | | | | | | | | | | | | | | | |

| SPH / CYL | 0.00 | -0.25 | -0.50 | -0.75 | -1.00 | -1.25 | -1.50 | -1.75 | -2.00 | -2.25 | -2.50 | -2.75 | -3.00 | -3.25 | -3.50 | -3.75 | -4.00 |
|---|---|---|---|---|---|---|---|---|---|---|---|---|---|---|---|---|---|
| +8.00 | 9.00 | 8.75 | 8.50 | 8.25 | 9.00 | 8.75 | 8.50 | 8.25 | 9.00 | 8.75 | 8.50 | 8.25 | 9.00 | 8.75 | 8.50 | 8.25 | 9.00 |
| +7.75 | 8.75 | 8.50 | 8.25 | 8.00 | 8.75 | 8.50 | 8.25 | 8.00 | 8.75 | 8.50 | 8.25 | 8.00 | 8.75 | 8.50 | 8.25 | 8.00 | 8.75 |
| +7.50 | 8.50 | 8.25 | 8.00 | 7.75 | 8.50 | 8.25 | 8.00 | 7.75 | 8.50 | 8.25 | 8.00 | 7.75 | 8.50 | 8.25 | 8.00 | 7.75 | 8.50 |
| +7.25 | 8.25 | 8.00 | 7.75 | 7.50 | 8.25 | 8.00 | 7.75 | 7.50 | 8.25 | 8.00 | 7.75 | 7.50 | 8.25 | 8.00 | 7.75 | 7.50 | 8.25 |
| +7.00 | 9.00 | 8.75 | 8.50 | 8.25 | 9.00 | 8.75 | 8.50 | 8.25 | 9.00 | 8.75 | 8.50 | 8.25 | 9.00 | 8.75 | 8.50 | 8.25 | 9.00 |
| +6.75 | 8.75 | 8.50 | 8.25 | 8.00 | 8.75 | 8.50 | 8.25 | 8.00 | 8.75 | 8.50 | 8.25 | 8.00 | 8.75 | 8.50 | 8.25 | 8.00 | 8.75 |
| +6.50 | 8.50 | 8.25 | 8.00 | 7.75 | 8.50 | 8.25 | 8.00 | 7.75 | 8.50 | 8.25 | 8.00 | 7.75 | 8.50 | 8.25 | 8.00 | 7.75 | 8.50 |
| +6.25 | 8.25 | 8.00 | 7.75 | 7.50 | 8.25 | 8.00 | 7.75 | 7.50 | 8.25 | 8.00 | 7.75 | 7.50 | 8.25 | 8.00 | 7.75 | 7.50 | 8.25 |
| +6.00 | 9.00 | 8.75 | 8.50 | 8.25 | 9.00 | 8.75 | 8.50 | 8.25 | 9.00 | 8.75 | 8.50 | 8.25 | 9.00 | 8.75 | 8.50 | 8.25 | 9.00 |
| +5.75 | 8.75 | 8.50 | 8.25 | 8.00 | 8.75 | 8.50 | 8.25 | 8.00 | 8.75 | 8.50 | 8.25 | 8.00 | 8.75 | 8.50 | 8.25 | 8.00 | 8.75 |
| +5.50 | 8.50 | 8.25 | 8.00 | 7.75 | 8.50 | 8.25 | 8.00 | 7.75 | 8.50 | 8.25 | 8.00 | 7.75 | 8.50 | 8.25 | 8.00 | 7.75 | 8.50 |
| +5.25 | 8.25 | 8.00 | 7.75 | 7.50 | 8.25 | 8.00 | 7.75 | 7.50 | 8.25 | 8.00 | 7.75 | 7.50 | 8.25 | 8.00 | 7.75 | 7.50 | 8.25 |
| +5.00 | 7.00 | 6.75 | 6.50 | 6.25 | 7.00 | 6.75 | 6.50 | 6.25 | 7.00 | 6.75 | 6.50 | 6.25 | 7.00 | 6.75 | 6.50 | 6.25 | 7.00 |
| +4.75 | 6.75 | 6.50 | 6.25 | 6.00 | 6.75 | 6.50 | 6.25 | 6.00 | 6.75 | 6.50 | 6.25 | 6.00 | 6.75 | 6.50 | 6.25 | 6.00 | 6.75 |
| +4.50 | 6.50 | 6.25 | 6.00 | 5.75 | 6.50 | 6.25 | 6.00 | 5.75 | 6.50 | 6.25 | 6.00 | 5.75 | 6.50 | 6.25 | 6.00 | 5.75 | 6.50 |
| +4.25 | 6.25 | 6.00 | 5.75 | 5.50 | 6.25 | 6.00 | 5.75 | 5.50 | 6.25 | 6.00 | 5.75 | 5.50 | 6.25 | 6.00 | 5.75 | 5.50 | 6.25 |
| +4.00 | 7.00 | 6.75 | 6.50 | 6.25 | 7.00 | 6.75 | 6.50 | 6.25 | 7.00 | 6.75 | 6.50 | 6.25 | 7.00 | 6.75 | 6.50 | 6.25 | 7.00 |
| +3.75 | 6.75 | 6.50 | 6.25 | 6.00 | 6.75 | 6.50 | 6.25 | 6.00 | 6.75 | 6.50 | 6.25 | 6.00 | 6.75 | 6.50 | 6.25 | 6.00 | 6.75 |
| +3.50 | 6.50 | 6.25 | 6.00 | 5.75 | 6.50 | 6.25 | 6.00 | 5.75 | 6.50 | 6.25 | 6.00 | 5.75 | 6.50 | 6.25 | 6.00 | 5.75 | 6.50 |
| +3.25 | 6.25 | 6.00 | 5.75 | 5.50 | 6.25 | 6.00 | 5.75 | 5.50 | 6.25 | 6.00 | 5.75 | 5.50 | 6.25 | 6.00 | 5.75 | 5.50 | 6.25 |
| +3.00 | 7.00 | 6.75 | 6.50 | 6.25 | 7.00 | 6.75 | 6.50 | 6.25 | 7.00 | 6.75 | 6.50 | 6.25 | 7.00 | 6.75 | 6.50 | 6.25 | 7.00 |
| +2.75 | 6.75 | 6.50 | 6.25 | 6.00 | 6.75 | 6.50 | 6.25 | 6.00 | 6.75 | 6.50 | 6.25 | 6.00 | 6.75 | 6.50 | 6.25 | 6.00 | 6.75 |
| +2.50 | 6.50 | 6.25 | 6.00 | 5.75 | 6.50 | 6.25 | 6.00 | 5.75 | 6.50 | 6.25 | 6.00 | 5.75 | 6.50 | 6.25 | 6.00 | 5.75 | 6.50 |
| +2.25 | 6.25 | 6.00 | 5.75 | 5.50 | 6.25 | 6.00 | 5.75 | 5.50 | 6.25 | 6.00 | 5.75 | 5.50 | 6.25 | 6.00 | 5.75 | 5.50 | 6.25 |
| +2.00 | 5.00 | 4.75 | 4.50 | 4.25 | 5.00 | 4.75 | 4.50 | 4.25 | 5.00 | 4.75 | 4.50 | 4.25 | 5.00 | 4.75 | 4.50 | 4.25 | 5.00 |
| +1.75 | 4.75 | 4.50 | 4.25 | 4.00 | 4.75 | 4.50 | 4.25 | 4.00 | 4.75 | 4.50 | 4.25 | 4.00 | 4.75 | 4.50 | 4.25 | 4.00 | 4.75 |
| +1.50 | 4.50 | 4.25 | 4.00 | 3.75 | 4.50 | 4.25 | 4.00 | 3.75 | 4.50 | 4.25 | 4.00 | 3.75 | 4.50 | 4.25 | 4.00 | 3.75 | 4.50 |
| +1.25 | 4.25 | 4.00 | 3.75 | 3.50 | 4.25 | 4.00 | 3.75 | 3.50 | 4.25 | 4.00 | 3.75 | 3.50 | 4.25 | 4.00 | 3.75 | 3.50 | 4.25 |
| +1.00 | 5.00 | 4.75 | 4.50 | 4.25 | 5.00 | 4.75 | 4.50 | 4.25 | 5.00 | 4.75 | 4.50 | 4.25 | 5.00 | 4.75 | 4.50 | 4.25 | 5.00 |
| +0.75 | 4.75 | 4.50 | 4.25 | 4.00 | 4.75 | 4.50 | 4.25 | 4.00 | 4.75 | 4.50 | 4.25 | 4.00 | 4.75 | 4.50 | 4.25 | 4.00 | 4.75 |
| +0.50 | 4.50 | 4.25 | 4.00 | 3.75 | 4.50 | 4.25 | 4.00 | 3.75 | 4.50 | 4.25 | 4.00 | 3.75 | 4.50 | 4.25 | 4.00 | 3.75 | 4.50 |
| +0.25 | 4.25 | 4.00 | 3.75 | 3.50 | 4.25 | 4.00 | 3.75 | 3.50 | 4.25 | 4.00 | 3.75 | 3.50 | 4.25 | 4.00 | 3.75 | 3.50 | 4.25 |
| +0.00 | 5.00 | 4.75 | 4.50 | 4.25 | 5.00 | 4.75 | 4.50 | 4.25 | 5.00 | 4.75 | 4.50 | 4.25 | 5.00 | 4.75 | 4.50 | 4.25 | 5.00 |
| -0.25 | 5.75 | 5.50 | 5.25 | 5.00 | 5.75 | 5.50 | 5.25 | 5.00 | 5.75 | 5.50 | 5.25 | 5.00 | 5.75 | 5.50 | 5.25 | 3.00 | 3.75 |
| -0.50 | 5.50 | 5.25 | 5.00 | 4.75 | 5.50 | 5.25 | 5.00 | 4.75 | 5.50 | 5.25 | 5.00 | 4.75 | 5.50 | 5.25 | 3.00 | 2.75 | 3.50 |
| -0.75 | 5.25 | 5.00 | 4.75 | 4.50 | 5.25 | 5.00 | 4.75 | 4.50 | 5.25 | 5.00 | 4.75 | 2.50 | 3.25 | 3.00 | 2.75 | 2.50 | 3.25 |
| -1.00 | 5.00 | 4.75 | 4.50 | 4.25 | 5.00 | 4.75 | 4.50 | 4.25 | 5.00 | 2.75 | 2.50 | 2.25 | 3.00 | 2.75 | 2.50 | 2.25 | 3.00 |
| -1.25 | 5.75 | 5.50 | 5.25 | 5.00 | 5.75 | 5.50 | 5.25 | 3.00 | 3.75 | 3.50 | 3.25 | 3.00 | 3.75 | 3.50 | 3.25 | 3.00 | 3.75 |
| -1.50 | 5.50 | 5.25 | 5.00 | 4.75 | 5.50 | 3.25 | 3.00 | 2.75 | 3.50 | 3.25 | 3.00 | 2.75 | 3.50 | 3.25 | 3.00 | 2.75 | 3.50 |
| -1.75 | 5.25 | 5.00 | 4.75 | 2.50 | 3.25 | 3.00 | 2.75 | 2.50 | 3.25 | 3.00 | 2.75 | 2.50 | 3.25 | 3.00 | 2.75 | 2.50 | 3.25 |
| -2.00 | 5.00 | 2.75 | 2.50 | 2.25 | 3.00 | 2.75 | 2.50 | 2.25 | 3.00 | 2.75 | 2.50 | 2.25 | 3.00 | 2.75 | 2.50 | 2.25 | 3.00 |
| -2.25 | 3.75 | 3.50 | 3.25 | 3.00 | 3.75 | 3.50 | 3.25 | 3.00 | 3.75 | 3.50 | 3.25 | 3.00 | 3.75 | 3.50 | 3.25 | 3.00 | 1.75 |
| -2.50 | 3.50 | 3.25 | 3.00 | 2.75 | 3.50 | 3.25 | 3.00 | 2.75 | 3.50 | 3.25 | 3.00 | 2.75 | 3.50 | 3.25 | 3.00 | 0.75 | 1.50 |
| -2.75 | 3.25 | 3.00 | 2.75 | 2.50 | 3.25 | 3.00 | 2.75 | 2.50 | 3.25 | 3.00 | 2.75 | 2.50 | 3.25 | 3.00 | 0.75 | 0.50 | 1.25 |
| -3.00 | 3.00 | 2.75 | 2.50 | 2.25 | 3.00 | 2.75 | 2.50 | 2.25 | 3.00 | 2.75 | 2.50 | 2.25 | 3.00 | 0.75 | 0.50 | 0.25 | 1.00 |
| -3.25 | 3.75 | 3.50 | 3.25 | 3.00 | 3.75 | 3.50 | 3.25 | 3.00 | 3.75 | 3.50 | 3.25 | 3.00 | 1.75 | 1.50 | 1.25 | 1.00 | 1.75 |
| -3.50 | 3.50 | 3.25 | 3.00 | 2.75 | 3.50 | 3.25 | 3.00 | 2.75 | 3.50 | 3.25 | 3.00 | 0.75 | 1.50 | 1.25 | 1.00 | 0.75 | 1.50 |
| -3.75 | 3.25 | 3.00 | 2.75 | 2.50 | 3.25 | 3.00 | 2.75 | 2.50 | 3.25 | 3.00 | 0.75 | 0.50 | 1.25 | 1.00 | 0.75 | 0.50 | 1.25 |
| -4.00 | 3.00 | 2.75 | 2.50 | 2.25 | 3.00 | 2.75 | 2.50 | 2.25 | 3.00 | 0.75 | 0.50 | 0.25 | 1.00 | 0.75 | 0.50 | 0.25 | 1.00 |
| -4.25 | 3.75 | 3.50 | 3.25 | 3.00 | 3.75 | 3.50 | 3.25 | 3.00 | 1.75 | 1.50 | 1.25 | 1.00 | 1.75 | 1.50 | 1.25 | 1.00 | 1.75 |
| -4.50 | 3.50 | 3.25 | 3.00 | 2.75 | 3.50 | 3.25 | 3.00 | 0.75 | 1.50 | 1.25 | 1.00 | 0.75 | 1.50 | 1.25 | 1.00 | 0.75 | 1.50 |
| -4.75 | 3.25 | 3.00 | 2.75 | 2.50 | 3.25 | 3.00 | 0.75 | 0.50 | 1.25 | 1.00 | 0.75 | 0.50 | 1.25 | 1.00 | 0.75 | 0.50 | 1.25 |
| -5.00 | 3.00 | 2.75 | 2.50 | 2.25 | 3.00 | 0.75 | 0.50 | 0.25 | 1.00 | 0.75 | 0.50 | 0.25 | 1.00 | 0.75 | 0.50 | 0.25 | 1.00 |
| -5.25 | 3.75 | 3.50 | 3.25 | 3.00 | 1.75 | 1.50 | 1.25 | 1.00 | 1.75 | 1.50 | 1.25 | 1.00 | 1.75 | 1.50 | 1.25 | 1.00 | 1.75 |
| -5.50 | 3.50 | 3.25 | 3.00 | 0.75 | 1.50 | 1.25 | 1.00 | 0.75 | 1.50 | 1.25 | 1.00 | 0.75 | 1.50 | 1.25 | 1.00 | 0.75 | 1.50 |
| -5.75 | 3.25 | 3.00 | 0.75 | 0.50 | 1.25 | 1.00 | 0.75 | 0.50 | 1.25 | 1.00 | 0.75 | 0.50 | 1.25 | 1.00 | 0.75 | 0.50 | 1.25 |
| -6.00 | 3.00 | 0.75 | 0.50 | 0.25 | 1.00 | 0.75 | 0.50 | 0.25 | 1.00 | 0.75 | 0.50 | 0.25 | 1.00 | 0.75 | 0.50 | 0.25 | 1.00 |
| -6.25 | 1.75 | 1.50 | 1.25 | 1.00 | 1.75 | 1.50 | 1.25 | 1.00 | 1.75 | 1.50 | 1.25 | 1.00 | 1.75 | 1.50 | 1.25 | 1.00 | |
| -6.50 | 1.50 | 1.25 | 1.00 | 0.75 | 1.50 | 1.25 | 1.00 | 0.75 | 1.50 | 1.25 | 1.00 | 0.75 | 1.50 | 1.25 | 1.00 | | |
| -6.75 | 1.25 | 1.00 | 0.75 | 0.50 | 1.25 | 1.00 | 0.75 | 0.50 | 1.25 | 1.00 | 0.75 | 0.50 | 1.25 | 1.00 | | | |
| -7.00 | 1.00 | 0.75 | 0.50 | 0.25 | 1.00 | 0.75 | 0.50 | 0.25 | 1.00 | 0.75 | 0.50 | 0.25 | 1.00 | | | | |
| -7.25 | 1.75 | 1.50 | 1.25 | 1.00 | 1.75 | 1.50 | 1.25 | 1.00 | 1.75 | 1.50 | 1.25 | 1.00 | | | | | |
| -7.50 | 1.50 | 1.25 | 1.00 | 0.75 | 1.50 | 1.25 | 1.00 | 0.75 | 1.50 | 1.25 | 1.00 | | | | | | |
| -7.75 | 1.25 | 1.00 | 0.75 | 0.50 | 1.25 | 1.00 | 0.75 | 0.50 | 1.25 | 1.00 | | | | | | | |
| -8.00 | 1.00 | 0.75 | 0.50 | 0.25 | 1.00 | 0.75 | 0.50 | 0.25 | 1.00 | | | | | | | | |
| -8.25 | 1.75 | 1.50 | 1.25 | 1.00 | 1.75 | 1.50 | 1.25 | 1.00 | | | | | | | | | |
| -8.50 | 1.50 | 1.25 | 1.00 | 0.75 | 1.50 | 1.25 | 1.00 | | | | | | | | | | |
| -8.75 | 1.25 | 1.00 | 0.75 | 0.50 | 1.25 | 1.00 | | | | | | | | | | | |
| -9.00 | 1.00 | 0.75 | 0.50 | 0.25 | 1.00 | | | | | | | | | | | | |
| -9.25 | 1.75 | 1.50 | 1.25 | 1.00 | | | | | | | | | | | | | |
| -9.50 | 1.50 | 1.25 | 1.00 | | | | | | | | | | | | | | |
| -9.75 | 1.25 | 1.00 | | | | | | | | | | | | | | | |
| -10.00 | 1.00 | | | | | | | | | | | | | | | | |

FIG. 17

| SPH / CYL | 0.00 | -0.25 | -0.50 | -0.75 | -1.00 | -1.25 | -1.50 | -1.75 | -2.00 | -2.25 | -2.50 | -2.75 | -3.00 | -3.25 | -3.50 | -3.75 | -4.00 |
|---|---|---|---|---|---|---|---|---|---|---|---|---|---|---|---|---|---|
| +8.00 | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 |
| +7.75 | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 |
| +7.50 | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 |
| +7.25 | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 |
| +7.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 |
| +6.75 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 |
| +6.50 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 |
| +6.25 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 |
| +6.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 |
| +5.75 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 |
| +5.50 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 |
| +5.25 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 |
| +5.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 |
| +4.75 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 |
| +4.50 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 |
| +4.25 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 |
| +4.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 |
| +3.75 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 |
| +3.50 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 |
| +3.25 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 |
| +3.00 | 4.00 | 4.00 | 4.00 | 4.00 | 4.00 | 4.00 | 4.00 | 4.00 | 4.00 | 4.00 | 4.00 | 4.00 | 4.00 | 4.00 | 4.00 | 4.00 | 4.00 |
| +2.75 | 4.00 | 4.00 | 4.00 | 4.00 | 4.00 | 4.00 | 4.00 | 4.00 | 4.00 | 4.00 | 4.00 | 4.00 | 4.00 | 4.00 | 4.00 | 4.00 | 4.00 |
| +2.50 | 4.00 | 4.00 | 4.00 | 4.00 | 4.00 | 4.00 | 4.00 | 4.00 | 4.00 | 4.00 | 4.00 | 4.00 | 4.00 | 4.00 | 4.00 | 4.00 | 4.00 |
| +2.25 | 4.00 | 4.00 | 4.00 | 4.00 | 4.00 | 4.00 | 4.00 | 4.00 | 4.00 | 4.00 | 4.00 | 4.00 | 4.00 | 4.00 | 4.00 | 4.00 | 4.00 |
| +2.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 |
| +1.75 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 |
| +1.50 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 |
| +1.25 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 |
| +1.00 | 4.00 | 4.00 | 4.00 | 4.00 | 4.00 | 4.00 | 4.00 | 4.00 | 4.00 | 4.00 | 4.00 | 4.00 | 4.00 | 4.00 | 4.00 | 4.00 | 4.00 |
| +0.75 | 4.00 | 4.00 | 4.00 | 4.00 | 4.00 | 4.00 | 4.00 | 4.00 | 4.00 | 4.00 | 4.00 | 4.00 | 4.00 | 4.00 | 4.00 | 4.00 | 4.00 |
| +0.50 | 4.00 | 4.00 | 4.00 | 4.00 | 4.00 | 4.00 | 4.00 | 4.00 | 4.00 | 4.00 | 4.00 | 4.00 | 4.00 | 4.00 | 4.00 | 4.00 | 4.00 |
| +0.25 | 4.00 | 4.00 | 4.00 | 4.00 | 4.00 | 4.00 | 4.00 | 4.00 | 4.00 | 4.00 | 4.00 | 4.00 | 4.00 | 4.00 | 4.00 | 4.00 | 4.00 |
| +0.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| -0.25 | 6.00 | 6.00 | 6.00 | 6.00 | 6.00 | 6.00 | 6.00 | 6.00 | 6.00 | 6.00 | 6.00 | 6.00 | 6.00 | 6.00 | 6.00 | 4.00 | 4.00 |
| -0.50 | 6.00 | 6.00 | 6.00 | 6.00 | 6.00 | 6.00 | 6.00 | 6.00 | 6.00 | 6.00 | 6.00 | 6.00 | 6.00 | 4.00 | 4.00 | 4.00 | 4.00 |
| -0.75 | 6.00 | 6.00 | 6.00 | 6.00 | 6.00 | 6.00 | 6.00 | 6.00 | 6.00 | 6.00 | 6.00 | 4.00 | 4.00 | 4.00 | 4.00 | 4.00 | 4.00 |
| -1.00 | 6.00 | 6.00 | 6.00 | 6.00 | 6.00 | 6.00 | 6.00 | 6.00 | 6.00 | 4.00 | 4.00 | 4.00 | 4.00 | 4.00 | 4.00 | 4.00 | 4.00 |
| -1.25 | 7.00 | 7.00 | 7.00 | 7.00 | 7.00 | 7.00 | 7.00 | 5.00 | 5.00 | 5.00 | 5.00 | 5.00 | 5.00 | 5.00 | 5.00 | 5.00 | 5.00 |
| -1.50 | 7.00 | 7.00 | 7.00 | 7.00 | 7.00 | 5.00 | 5.00 | 5.00 | 5.00 | 5.00 | 5.00 | 5.00 | 5.00 | 5.00 | 5.00 | 5.00 | 5.00 |
| -1.75 | 7.00 | 7.00 | 7.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| -2.00 | 7.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| -2.25 | 6.00 | 6.00 | 6.00 | 6.00 | 6.00 | 6.00 | 6.00 | 6.00 | 6.00 | 6.00 | 6.00 | 6.00 | 6.00 | 6.00 | 6.00 | 6.00 | 4.00 |
| -2.50 | 6.00 | 6.00 | 6.00 | 6.00 | 6.00 | 6.00 | 6.00 | 6.00 | 6.00 | 6.00 | 6.00 | 6.00 | 6.00 | 6.00 | 6.00 | 4.00 | 4.00 |
| -2.75 | 6.00 | 6.00 | 6.00 | 6.00 | 6.00 | 6.00 | 6.00 | 6.00 | 6.00 | 6.00 | 6.00 | 6.00 | 6.00 | 4.00 | 4.00 | 4.00 | 4.00 |
| -3.00 | 6.00 | 6.00 | 6.00 | 6.00 | 6.00 | 6.00 | 6.00 | 6.00 | 6.00 | 6.00 | 6.00 | 6.00 | 4.00 | 4.00 | 4.00 | 4.00 | 4.00 |
| -3.25 | 7.00 | 7.00 | 7.00 | 7.00 | 7.00 | 7.00 | 7.00 | 7.00 | 7.00 | 7.00 | 7.00 | 7.00 | 5.00 | 5.00 | 5.00 | 5.00 | 5.00 |
| -3.50 | 7.00 | 7.00 | 7.00 | 7.00 | 7.00 | 7.00 | 7.00 | 7.00 | 7.00 | 7.00 | 7.00 | 5.00 | 5.00 | 5.00 | 5.00 | 5.00 | 5.00 |
| -3.75 | 7.00 | 7.00 | 7.00 | 7.00 | 7.00 | 7.00 | 7.00 | 7.00 | 7.00 | 7.00 | 5.00 | 5.00 | 5.00 | 5.00 | 5.00 | 5.00 | 5.00 |
| -4.00 | 7.00 | 7.00 | 7.00 | 7.00 | 7.00 | 7.00 | 7.00 | 7.00 | 7.00 | 5.00 | 5.00 | 5.00 | 5.00 | 5.00 | 5.00 | 5.00 | 5.00 |
| -4.25 | 8.00 | 8.00 | 8.00 | 8.00 | 8.00 | 8.00 | 8.00 | 8.00 | 6.00 | 6.00 | 6.00 | 6.00 | 6.00 | 6.00 | 6.00 | 6.00 | 6.00 |
| -4.50 | 8.00 | 8.00 | 8.00 | 8.00 | 8.00 | 8.00 | 8.00 | 6.00 | 6.00 | 6.00 | 6.00 | 6.00 | 6.00 | 6.00 | 6.00 | 6.00 | 6.00 |
| -4.75 | 8.00 | 8.00 | 8.00 | 8.00 | 8.00 | 8.00 | 6.00 | 6.00 | 6.00 | 6.00 | 6.00 | 6.00 | 6.00 | 6.00 | 6.00 | 6.00 | 6.00 |
| -5.00 | 8.00 | 8.00 | 8.00 | 8.00 | 8.00 | 6.00 | 6.00 | 6.00 | 6.00 | 6.00 | 6.00 | 6.00 | 6.00 | 6.00 | 6.00 | 6.00 | 6.00 |
| -5.25 | 9.00 | 9.00 | 9.00 | 9.00 | 7.00 | 7.00 | 7.00 | 7.00 | 7.00 | 7.00 | 7.00 | 7.00 | 7.00 | 7.00 | 7.00 | 7.00 | 7.00 |
| -5.50 | 9.00 | 9.00 | 9.00 | 7.00 | 7.00 | 7.00 | 7.00 | 7.00 | 7.00 | 7.00 | 7.00 | 7.00 | 7.00 | 7.00 | 7.00 | 7.00 | 7.00 |
| -5.75 | 9.00 | 9.00 | 7.00 | 7.00 | 7.00 | 7.00 | 7.00 | 7.00 | 7.00 | 7.00 | 7.00 | 7.00 | 7.00 | 7.00 | 7.00 | 7.00 | 7.00 |
| -6.00 | 9.00 | 7.00 | 7.00 | 7.00 | 7.00 | 7.00 | 7.00 | 7.00 | 7.00 | 7.00 | 7.00 | 7.00 | 7.00 | 7.00 | 7.00 | 7.00 | 7.00 |
| -6.25 | 8.00 | 8.00 | 8.00 | 8.00 | 8.00 | 8.00 | 8.00 | 8.00 | 8.00 | 8.00 | 8.00 | 8.00 | 8.00 | 8.00 | 8.00 | 8.00 | |
| -6.50 | 8.00 | 8.00 | 8.00 | 8.00 | 8.00 | 8.00 | 8.00 | 8.00 | 8.00 | 8.00 | 8.00 | 8.00 | 8.00 | 8.00 | 8.00 | | |
| -6.75 | 8.00 | 8.00 | 8.00 | 8.00 | 8.00 | 8.00 | 8.00 | 8.00 | 8.00 | 8.00 | 8.00 | 8.00 | 8.00 | 8.00 | | | |
| -7.00 | 8.00 | 8.00 | 8.00 | 8.00 | 8.00 | 8.00 | 8.00 | 8.00 | 8.00 | 8.00 | 8.00 | 8.00 | 8.00 | | | | |
| -7.25 | 9.00 | 9.00 | 9.00 | 9.00 | 9.00 | 9.00 | 9.00 | 9.00 | 9.00 | 9.00 | 9.00 | 9.00 | | | | | |
| -7.50 | 9.00 | 9.00 | 9.00 | 9.00 | 9.00 | 9.00 | 9.00 | 9.00 | 9.00 | 9.00 | 9.00 | | | | | | |
| -7.75 | 9.00 | 9.00 | 9.00 | 9.00 | 9.00 | 9.00 | 9.00 | 9.00 | 9.00 | 9.00 | | | | | | | |
| -8.00 | 9.00 | 9.00 | 9.00 | 9.00 | 9.00 | 9.00 | 9.00 | 9.00 | 9.00 | | | | | | | | |
| -8.25 | 10.00 | 10.00 | 10.00 | 10.00 | 10.00 | 10.00 | 10.00 | 10.00 | | | | | | | | | |
| -8.50 | 10.00 | 10.00 | 10.00 | 10.00 | 10.00 | 10.00 | 10.00 | | | | | | | | | | |
| -8.75 | 10.00 | 10.00 | 10.00 | 10.00 | 10.00 | 10.00 | | | | | | | | | | | |
| -9.00 | 10.00 | 10.00 | 10.00 | 10.00 | 10.00 | | | | | | | | | | | | |
| -9.25 | 11.00 | 11.00 | 11.00 | 11.00 | | | | | | | | | | | | | |
| -9.50 | 11.00 | 11.00 | 11.00 | | | | | | | | | | | | | | |
| -9.75 | 11.00 | 11.00 | | | | | | | | | | | | | | | |
| -10.00 | 11.00 | | | | | | | | | | | | | | | | |

| SPH / CYL | 0.00 | -0.25 | -0.50 | -0.75 | -1.00 | -1.25 | -1.50 | -1.75 | -2.00 | -2.25 | -2.50 | -2.75 | -3.00 | -3.25 | -3.50 | -3.75 | -4.00 |
|---|---|---|---|---|---|---|---|---|---|---|---|---|---|---|---|---|---|
| +8.00 | 1.00 | 1.00 | 1.00 | 1.00 | 2.00 | 2.00 | 2.00 | 2.00 | 3.00 | 3.00 | 3.00 | 3.00 | 4.00 | 4.00 | 4.00 | 4.00 | 5.00 |
| +7.75 | 1.00 | 1.00 | 1.00 | 1.00 | 2.00 | 2.00 | 2.00 | 2.00 | 3.00 | 3.00 | 3.00 | 3.00 | 4.00 | 4.00 | 4.00 | 4.00 | 5.00 |
| +7.50 | 1.00 | 1.00 | 1.00 | 1.00 | 2.00 | 2.00 | 2.00 | 2.00 | 3.00 | 3.00 | 3.00 | 3.00 | 4.00 | 4.00 | 4.00 | 4.00 | 5.00 |
| +7.25 | 1.00 | 1.00 | 1.00 | 1.00 | 2.00 | 2.00 | 2.00 | 2.00 | 3.00 | 3.00 | 3.00 | 3.00 | 4.00 | 4.00 | 4.00 | 4.00 | 5.00 |
| +7.00 | 2.00 | 2.00 | 2.00 | 2.00 | 3.00 | 3.00 | 3.00 | 3.00 | 4.00 | 4.00 | 4.00 | 4.00 | 5.00 | 5.00 | 5.00 | 5.00 | 6.00 |
| +6.75 | 2.00 | 2.00 | 2.00 | 2.00 | 3.00 | 3.00 | 3.00 | 3.00 | 4.00 | 4.00 | 4.00 | 4.00 | 5.00 | 5.00 | 5.00 | 5.00 | 6.00 |
| +6.50 | 2.00 | 2.00 | 2.00 | 2.00 | 3.00 | 3.00 | 3.00 | 3.00 | 4.00 | 4.00 | 4.00 | 4.00 | 5.00 | 5.00 | 5.00 | 5.00 | 6.00 |
| +6.25 | 2.00 | 2.00 | 2.00 | 2.00 | 3.00 | 3.00 | 3.00 | 3.00 | 4.00 | 4.00 | 4.00 | 4.00 | 5.00 | 5.00 | 5.00 | 5.00 | 6.00 |
| +6.00 | 3.00 | 3.00 | 3.00 | 3.00 | 4.00 | 4.00 | 4.00 | 4.00 | 5.00 | 5.00 | 5.00 | 5.00 | 6.00 | 6.00 | 6.00 | 6.00 | 7.00 |
| +5.75 | 3.00 | 3.00 | 3.00 | 3.00 | 4.00 | 4.00 | 4.00 | 4.00 | 5.00 | 5.00 | 5.00 | 5.00 | 6.00 | 6.00 | 6.00 | 6.00 | 7.00 |
| +5.50 | 3.00 | 3.00 | 3.00 | 3.00 | 4.00 | 4.00 | 4.00 | 4.00 | 5.00 | 5.00 | 5.00 | 5.00 | 6.00 | 6.00 | 6.00 | 6.00 | 7.00 |
| +5.25 | 3.00 | 3.00 | 3.00 | 3.00 | 4.00 | 4.00 | 4.00 | 4.00 | 5.00 | 5.00 | 5.00 | 5.00 | 6.00 | 6.00 | 6.00 | 6.00 | 7.00 |
| +5.00 | 2.00 | 2.00 | 2.00 | 2.00 | 3.00 | 3.00 | 3.00 | 3.00 | 4.00 | 4.00 | 4.00 | 4.00 | 5.00 | 5.00 | 5.00 | 5.00 | 6.00 |
| +4.75 | 2.00 | 2.00 | 2.00 | 2.00 | 3.00 | 3.00 | 3.00 | 3.00 | 4.00 | 4.00 | 4.00 | 4.00 | 5.00 | 5.00 | 5.00 | 5.00 | 6.00 |
| +4.50 | 2.00 | 2.00 | 2.00 | 2.00 | 3.00 | 3.00 | 3.00 | 3.00 | 4.00 | 4.00 | 4.00 | 4.00 | 5.00 | 5.00 | 5.00 | 5.00 | 6.00 |
| +4.25 | 2.00 | 2.00 | 2.00 | 2.00 | 3.00 | 3.00 | 3.00 | 3.00 | 4.00 | 4.00 | 4.00 | 4.00 | 5.00 | 5.00 | 5.00 | 5.00 | 6.00 |
| +4.00 | 3.00 | 3.00 | 3.00 | 3.00 | 4.00 | 4.00 | 4.00 | 4.00 | 5.00 | 5.00 | 5.00 | 5.00 | 6.00 | 6.00 | 6.00 | 6.00 | 7.00 |
| +3.75 | 3.00 | 3.00 | 3.00 | 3.00 | 4.00 | 4.00 | 4.00 | 4.00 | 5.00 | 5.00 | 5.00 | 5.00 | 6.00 | 6.00 | 6.00 | 6.00 | 7.00 |
| +3.50 | 3.00 | 3.00 | 3.00 | 3.00 | 4.00 | 4.00 | 4.00 | 4.00 | 5.00 | 5.00 | 5.00 | 5.00 | 6.00 | 6.00 | 6.00 | 6.00 | 7.00 |
| +3.25 | 3.00 | 3.00 | 3.00 | 3.00 | 4.00 | 4.00 | 4.00 | 4.00 | 5.00 | 5.00 | 5.00 | 5.00 | 6.00 | 6.00 | 6.00 | 6.00 | 7.00 |
| +3.00 | 4.00 | 4.00 | 4.00 | 4.00 | 5.00 | 5.00 | 5.00 | 5.00 | 6.00 | 6.00 | 6.00 | 6.00 | 7.00 | 7.00 | 7.00 | 7.00 | 8.00 |
| +2.75 | 4.00 | 4.00 | 4.00 | 4.00 | 5.00 | 5.00 | 5.00 | 5.00 | 6.00 | 6.00 | 6.00 | 6.00 | 7.00 | 7.00 | 7.00 | 7.00 | 8.00 |
| +2.50 | 4.00 | 4.00 | 4.00 | 4.00 | 5.00 | 5.00 | 5.00 | 5.00 | 6.00 | 6.00 | 6.00 | 6.00 | 7.00 | 7.00 | 7.00 | 7.00 | 8.00 |
| +2.25 | 4.00 | 4.00 | 4.00 | 4.00 | 5.00 | 5.00 | 5.00 | 5.00 | 6.00 | 6.00 | 6.00 | 6.00 | 7.00 | 7.00 | 7.00 | 7.00 | 8.00 |
| +2.00 | 3.00 | 3.00 | 3.00 | 3.00 | 4.00 | 4.00 | 4.00 | 4.00 | 5.00 | 5.00 | 5.00 | 5.00 | 6.00 | 6.00 | 6.00 | 6.00 | 7.00 |
| +1.75 | 3.00 | 3.00 | 3.00 | 3.00 | 4.00 | 4.00 | 4.00 | 4.00 | 5.00 | 5.00 | 5.00 | 5.00 | 6.00 | 6.00 | 6.00 | 6.00 | 7.00 |
| +1.50 | 3.00 | 3.00 | 3.00 | 3.00 | 4.00 | 4.00 | 4.00 | 4.00 | 5.00 | 5.00 | 5.00 | 5.00 | 6.00 | 6.00 | 6.00 | 6.00 | 7.00 |
| +1.25 | 3.00 | 3.00 | 3.00 | 3.00 | 4.00 | 4.00 | 4.00 | 4.00 | 5.00 | 5.00 | 5.00 | 5.00 | 6.00 | 6.00 | 6.00 | 6.00 | 7.00 |
| +1.00 | 4.00 | 4.00 | 4.00 | 4.00 | 5.00 | 5.00 | 5.00 | 5.00 | 6.00 | 6.00 | 6.00 | 6.00 | 7.00 | 7.00 | 7.00 | 7.00 | 8.00 |
| +0.75 | 4.00 | 4.00 | 4.00 | 4.00 | 5.00 | 5.00 | 5.00 | 5.00 | 6.00 | 6.00 | 6.00 | 6.00 | 7.00 | 7.00 | 7.00 | 7.00 | 8.00 |
| +0.50 | 4.00 | 4.00 | 4.00 | 4.00 | 5.00 | 5.00 | 5.00 | 5.00 | 6.00 | 6.00 | 6.00 | 6.00 | 7.00 | 7.00 | 7.00 | 7.00 | 8.00 |
| +0.25 | 4.00 | 4.00 | 4.00 | 4.00 | 5.00 | 5.00 | 5.00 | 5.00 | 6.00 | 6.00 | 6.00 | 6.00 | 7.00 | 7.00 | 7.00 | 7.00 | 8.00 |
| +0.00 | 5.00 | 5.00 | 5.00 | 5.00 | 6.00 | 6.00 | 6.00 | 6.00 | 7.00 | 7.00 | 7.00 | 7.00 | 8.00 | 8.00 | 8.00 | 8.00 | 9.00 |
| -0.25 | 6.00 | 6.00 | 6.00 | 6.00 | 7.00 | 7.00 | 7.00 | 7.00 | 8.00 | 8.00 | 8.00 | 8.00 | 9.00 | 9.00 | 9.00 | 7.00 | 8.00 |
| -0.50 | 6.00 | 6.00 | 6.00 | 6.00 | 7.00 | 7.00 | 7.00 | 7.00 | 8.00 | 8.00 | 8.00 | 8.00 | 9.00 | 7.00 | 7.00 | 7.00 | 8.00 |
| -0.75 | 6.00 | 6.00 | 6.00 | 6.00 | 7.00 | 7.00 | 7.00 | 7.00 | 8.00 | 8.00 | 8.00 | 6.00 | 7.00 | 7.00 | 7.00 | 7.00 | 8.00 |
| -1.00 | 6.00 | 6.00 | 6.00 | 6.00 | 7.00 | 7.00 | 7.00 | 7.00 | 8.00 | 6.00 | 6.00 | 6.00 | 7.00 | 7.00 | 7.00 | 7.00 | 8.00 |
| -1.25 | 7.00 | 7.00 | 7.00 | 7.00 | 8.00 | 8.00 | 8.00 | 6.00 | 7.00 | 7.00 | 7.00 | 7.00 | 8.00 | 8.00 | 8.00 | 8.00 | 9.00 |
| -1.50 | 7.00 | 7.00 | 7.00 | 7.00 | 8.00 | 6.00 | 6.00 | 6.00 | 7.00 | 7.00 | 7.00 | 7.00 | 8.00 | 8.00 | 8.00 | 8.00 | 9.00 |
| -1.75 | 7.00 | 7.00 | 7.00 | 5.00 | 6.00 | 6.00 | 6.00 | 6.00 | 7.00 | 7.00 | 7.00 | 7.00 | 8.00 | 8.00 | 8.00 | 8.00 | 9.00 |
| -2.00 | 7.00 | 5.00 | 5.00 | 5.00 | 6.00 | 6.00 | 6.00 | 6.00 | 7.00 | 7.00 | 7.00 | 7.00 | 8.00 | 8.00 | 8.00 | 8.00 | 9.00 |
| -2.25 | 6.00 | 6.00 | 6.00 | 6.00 | 7.00 | 7.00 | 7.00 | 7.00 | 8.00 | 8.00 | 8.00 | 8.00 | 9.00 | 9.00 | 9.00 | 9.00 | 8.00 |
| -2.50 | 6.00 | 6.00 | 6.00 | 6.00 | 7.00 | 7.00 | 7.00 | 7.00 | 8.00 | 8.00 | 8.00 | 8.00 | 9.00 | 9.00 | 9.00 | 7.00 | 8.00 |
| -2.75 | 6.00 | 6.00 | 6.00 | 6.00 | 7.00 | 7.00 | 7.00 | 7.00 | 8.00 | 8.00 | 8.00 | 8.00 | 9.00 | 9.00 | 7.00 | 7.00 | 8.00 |
| -3.00 | 6.00 | 6.00 | 6.00 | 6.00 | 7.00 | 7.00 | 7.00 | 7.00 | 8.00 | 8.00 | 8.00 | 8.00 | 9.00 | 7.00 | 7.00 | 7.00 | 8.00 |
| -3.25 | 7.00 | 7.00 | 7.00 | 7.00 | 8.00 | 8.00 | 8.00 | 8.00 | 9.00 | 9.00 | 9.00 | 9.00 | 8.00 | 8.00 | 8.00 | 8.00 | 9.00 |
| -3.50 | 7.00 | 7.00 | 7.00 | 7.00 | 8.00 | 8.00 | 8.00 | 8.00 | 9.00 | 9.00 | 9.00 | 7.00 | 8.00 | 8.00 | 8.00 | 8.00 | 9.00 |
| -3.75 | 7.00 | 7.00 | 7.00 | 7.00 | 8.00 | 8.00 | 8.00 | 8.00 | 9.00 | 9.00 | 7.00 | 7.00 | 8.00 | 8.00 | 8.00 | 8.00 | 9.00 |
| -4.00 | 7.00 | 7.00 | 7.00 | 7.00 | 8.00 | 8.00 | 8.00 | 8.00 | 9.00 | 7.00 | 7.00 | 7.00 | 8.00 | 8.00 | 8.00 | 8.00 | 9.00 |
| -4.25 | 8.00 | 8.00 | 8.00 | 8.00 | 9.00 | 9.00 | 9.00 | 9.00 | 8.00 | 8.00 | 8.00 | 8.00 | 9.00 | 9.00 | 9.00 | 9.00 | 10.00 |
| -4.50 | 8.00 | 8.00 | 8.00 | 8.00 | 9.00 | 9.00 | 9.00 | 7.00 | 8.00 | 8.00 | 8.00 | 8.00 | 9.00 | 9.00 | 9.00 | 9.00 | 10.00 |
| -4.75 | 8.00 | 8.00 | 8.00 | 8.00 | 9.00 | 9.00 | 7.00 | 7.00 | 8.00 | 8.00 | 8.00 | 8.00 | 9.00 | 9.00 | 9.00 | 9.00 | 10.00 |
| -5.00 | 8.00 | 8.00 | 8.00 | 8.00 | 9.00 | 7.00 | 7.00 | 7.00 | 8.00 | 8.00 | 8.00 | 8.00 | 9.00 | 9.00 | 9.00 | 9.00 | 10.00 |
| -5.25 | 9.00 | 9.00 | 9.00 | 9.00 | 8.00 | 8.00 | 8.00 | 8.00 | 9.00 | 9.00 | 9.00 | 9.00 | 10.00 | 10.00 | 10.00 | 10.00 | 11.00 |
| -5.50 | 9.00 | 9.00 | 9.00 | 7.00 | 8.00 | 8.00 | 8.00 | 8.00 | 9.00 | 9.00 | 9.00 | 9.00 | 10.00 | 10.00 | 10.00 | 10.00 | 11.00 |
| -5.75 | 9.00 | 9.00 | 7.00 | 7.00 | 8.00 | 8.00 | 8.00 | 8.00 | 9.00 | 9.00 | 9.00 | 9.00 | 10.00 | 10.00 | 10.00 | 10.00 | 11.00 |
| -6.00 | 9.00 | 7.00 | 7.00 | 7.00 | 8.00 | 8.00 | 8.00 | 8.00 | 9.00 | 9.00 | 9.00 | 9.00 | 10.00 | 10.00 | 10.00 | 10.00 | 11.00 |
| -6.25 | 8.00 | 8.00 | 8.00 | 8.00 | 9.00 | 9.00 | 9.00 | 9.00 | 10.00 | 10.00 | 10.00 | 10.00 | 11.00 | 11.00 | 11.00 | 11.00 | |
| -6.50 | 8.00 | 8.00 | 8.00 | 8.00 | 9.00 | 9.00 | 9.00 | 9.00 | 10.00 | 10.00 | 10.00 | 10.00 | 11.00 | 11.00 | 11.00 | | |
| -6.75 | 8.00 | 8.00 | 8.00 | 8.00 | 9.00 | 9.00 | 9.00 | 9.00 | 10.00 | 10.00 | 10.00 | 10.00 | 11.00 | 11.00 | | | |
| -7.00 | 8.00 | 8.00 | 8.00 | 8.00 | 9.00 | 9.00 | 9.00 | 9.00 | 10.00 | 10.00 | 10.00 | 10.00 | 11.00 | | | | |
| -7.25 | 9.00 | 9.00 | 9.00 | 9.00 | 10.00 | 10.00 | 10.00 | 10.00 | 11.00 | 11.00 | 11.00 | 11.00 | | | | | |
| -7.50 | 9.00 | 9.00 | 9.00 | 9.00 | 10.00 | 10.00 | 10.00 | 10.00 | 11.00 | 11.00 | 11.00 | | | | | | |
| -7.75 | 9.00 | 9.00 | 9.00 | 9.00 | 10.00 | 10.00 | 10.00 | 10.00 | 11.00 | 11.00 | | | | | | | |
| -8.00 | 9.00 | 9.00 | 9.00 | 9.00 | 10.00 | 10.00 | 10.00 | 10.00 | 11.00 | | | | | | | | |
| -8.25 | 10.00 | 10.00 | 10.00 | 10.00 | 11.00 | 11.00 | 11.00 | 11.00 | | | | | | | | | |
| -8.50 | 10.00 | 10.00 | 10.00 | 10.00 | 11.00 | 11.00 | 11.00 | | | | | | | | | | |
| -8.75 | 10.00 | 10.00 | 10.00 | 10.00 | 11.00 | 11.00 | | | | | | | | | | | |
| -9.00 | 10.00 | 10.00 | 10.00 | 10.00 | 11.00 | | | | | | | | | | | | |
| -9.25 | 11.00 | 11.00 | 11.00 | 11.00 | | | | | | | | | | | | | |
| -9.50 | 11.00 | 11.00 | 11.00 | | | | | | | | | | | | | | |
| -9.75 | 11.00 | 11.00 | | | | | | | | | | | | | | | |
| -10.00 | 11.00 | | | | | | | | | | | | | | | | |

| SPH / CYL | 0.00 | -0.25 | -0.50 | -0.75 | -1.00 | -1.25 | -1.50 | -1.75 | -2.00 | -2.25 | -2.50 | -2.75 | -3.00 | -3.25 | -3.50 | -3.75 | -4.00 |
|---|---|---|---|---|---|---|---|---|---|---|---|---|---|---|---|---|---|
| +8.00 | | | | | | | | | | | | | | | | | |
| +7.75 | | | | | | | | | | | | | | | | | |
| +7.50 | 1.00/1.00 | | | | 1.00/2.00 | | | | 1.00/3.00 | | | | 1.00/4.00 | | | | 1.00/5.00 |
| +7.25 | | | | | | | | | | | | | | | | | |
| +7.00 | | | | | | | | | | | | | | | | | |
| +6.75 | 2.00/2.00 | | | | 2.00/3.00 | | | | 2.00/4.00 | | | | 2.00/5.00 | | | | 2.00/6.00 |
| +6.50 | | | | | | | | | | | | | | | | | |
| +6.25 | | | | | | | | | | | | | | | | | |
| +6.00 | | | | | | | | | | | | | | | | | |
| +5.75 | 3.00/3.00 | | | | 3.00/4.00 | | | | 3.00/5.00 | | | | 3.00/6.00 | | | | 3.00/7.00 |
| +5.50 | | | | | | | | | | | | | | | | | |
| +5.25 | | | | | | | | | | | | | | | | | |
| +5.00 | | | | | | | | | | | | | | | | | |
| +4.75 | 2.00/2.00 | | | | 2.00/3.00 | | | | 2.00/4.00 | | | | 2.00/5.00 | | | | 2.00/6.00 |
| +4.50 | | | | | | | | | | | | | | | | | |
| +4.25 | | | | | | | | | | | | | | | | | |
| +4.00 | | | | | | | | | | | | | | | | | |
| +3.75 | 3.00/3.00 | | | | 3.00/4.00 | | | | 3.00/5.00 | | | | 3.00/6.00 | | | | 3.00/7.00 |
| +3.50 | | | | | | | | | | | | | | | | | |
| +3.25 | | | | | | | | | | | | | | | | | |
| +3.00 | | | | | | | | | | | | | | | | | |
| +2.75 | 4.00/4.00 | | | | 4.00/5.00 | | | | 4.00/6.00 | | | | 4.00/7.00 | | | | 4.00/8.00 |
| +2.50 | | | | | | | | | | | | | | | | | |
| +2.25 | | | | | | | | | | | | | | | | | |
| +2.00 | | | | | | | | | | | | | | | | | |
| +1.75 | 3.00/3.00 | | | | 3.00/4.00 | | | | 3.00/5.00 | | | | 3.00/6.00 | | | | 3.00/7.00 |
| +1.50 | | | | | | | | | | | | | | | | | |
| +1.25 | | | | | | | | | | | | | | | | | |
| +1.00 | | | | | | | | | | | | | | | | | |
| +0.75 | 4.00/4.00 | | | | 4.00/5.00 | | | | 4.00/6.00 | | | | 4.00/7.00 | | | | 4.00/8.00 |
| +0.50 | | | | | | | | | | | | | | | | | |
| +0.25 | | | | | | | | | | | | | | | | | |
| +0.00 | 5.00/5.00 | | | | 5.00/6.00 | | | | 5.00/7.00 | | | | 5.00/8.00 | | | | 5.00/9.00 |
| -0.25 | | | | | | | | | | | | | 6.00/9.00 | | | | |
| -0.50 | 6.00/6.00 | | | | 6.00/7.00 | | | | 6.00/8.00 | | | | | | | | 4.00/8.00 |
| -0.75 | | | | | | | | | | | | | | | | 4.00/7.00 | |
| -1.00 | | | | | | | | | | 4.00/6.00 | | | | | | | |
| -1.25 | 7.00/7.00 | | | | 7.00/8.00 | | | | | | | | | | | | |
| -1.50 | | | | | | | | | 5.00/7.00 | | | | 5.00/8.00 | | | | 5.00/9.00 |
| -1.75 | | | | | 5.00/6.00 | | | | | | | | | | | | |
| -2.00 | 5.00/5.00 | | | | | | | | | | | | | | | | |
| -2.25 | | | | | | | | | | | | | 6.00/9.00 | | | | |
| -2.50 | 6.00/6.00 | | | | 6.00/7.00 | | | | 6.00/8.00 | | | | | | | | 4.00/8.00 |
| -2.75 | | | | | | | | | | | | | | | 4.00/7.00 | | |
| -3.00 | | | | | | | | | | | | | | | | | |
| -3.25 | | | | | | | | | 7.00/9.00 | | | | | | | | |
| -3.50 | 7.00/7.00 | | | | 7.00/8.00 | | | | | | | | 5.00/8.00 | | | | 5.00/9.00 |
| -3.75 | | | | | | | | | 5.00/7.00 | | | | | | | | |
| -4.00 | | | | | 8.00/9.00 | | | | | | | | | | | | |
| -4.25 | | | | | | | | | | | | | | | | | |
| -4.50 | 8.00/8.00 | | | | | 6.00/7.00 | | | 6.00/8.00 | | | | 6.00/9.00 | | | | 6.00/10.00 |
| -4.75 | | | | | | | | | | | | | | | | | |
| -5.00 | 9.00/9.00 | | | | | | | | | | | | | | | | |
| -5.25 | | | | | | | | | | | | | | | | | |
| -5.50 | | | | | 7.00/8.00 | | | | 7.00/9.00 | | | | 7.00/10.00 | | | | 7.00/11.00 |
| -5.75 | | 7.00/7.00 | | | | | | | | | | | | | | | |
| -6.00 | | | | | | | | | | | | | | | | | |
| -6.25 | | | | | | | | | | | | | | | | | |
| -6.50 | 8.00/8.00 | | | | 8.00/9.00 | | | | 8.00/10.00 | | | | 8.00/11.00 | | | | |
| -6.75 | | | | | | | | | | | | | | | | | |
| -7.00 | | | | | | | | | | | | | | | | | |
| -7.25 | | | | | | | | | | | | | | | | | |
| -7.50 | 9.00/9.00 | | | | 9.00/10.00 | | | | 9.00/11.00 | | | | | | | | |
| -7.75 | | | | | | | | | | | | | | | | | |
| -8.00 | | | | | | | | | | | | | | | | | |
| -8.25 | | | | | | | | | | | | | | | | | |
| -8.50 | 10.00/10.00 | | | | 10.00/11.00 | | | | | | | | | | | | |
| -8.75 | | | | | | | | | | | | | | | | | |
| -9.00 | | | | | | | | | | | | | | | | | |
| -9.25 | | | | | | | | | | | | | | | | | |
| -9.50 | 11.00/11.00 | | | | | | | | | | | | | | | | |
| -9.75 | | | | | | | | | | | | | | | | | |
| -10.00 | | | | | | | | | | | | | | | | | |

FIG. 20

| D2/CYL | 0.00 | -1.00 | -2.00 | -3.00 | -4.00 |
|---|---|---|---|---|---|
| 1.00 | 1.00 | 2.00 | 3.00 | 4.00 | 5.00 |
| 2.00 | 2.00 | 3.00 | 4.00 | 5.00 | 6.00 |
| 3.00 | 3.00 | 4.00 | 5.00 | 6.00 | 7.00 |
| 4.00 | 4.00 | 5.00 | 6.00 | 7.00 | 8.00 |
| 5.00 | 5.00 | 6.00 | 7.00 | 8.00 | 9.00 |
| 6.00 | 6.00 | 7.00 | 8.00 | 9.00 | 10.00 |
| 7.00 | 7.00 | 8.00 | 9.00 | 10.00 | 11.00 |
| 8.00 | 8.00 | 9.00 | 10.00 | 11.00 | |
| 9.00 | 9.00 | 10.00 | 11.00 | | |
| 10.00 | 10.00 | 11.00 | | | |
| 11.00 | 11.00 | | | | |

PROGRESSIVE POWER LENS MANUFACTURING METHOD AND PROGRESSIVE POWER LENS

TECHNICAL FIELD

The present invention relates to a method for manufacturing progressive-power lenses (i.e., progressive refractive power lenses) for spectacles as well as progressive-power lenses, wherein a progressive-power surface is arranged on a convex surface side of each of the lenses.

BACKGROUND ART

Recently, progressive-power lenses having various types of refracting surfaces are being sold in the market.

The progressive-power lenses can be classified according to type, configuration and the like of the refracting surfaces thereof. For example, there are a convex surface progressive-power lens having a progressive-power surface (a curved surface having progressive-power) arranged on the convex surface side, a concave surface progressive-power lens having a progressive-power surface arranged on the concave surface side, a both-surface progressive-power lens having a progressive-power surface arranged on both surfaces, and an integrated-double surface progressive lens where the progressive-power is divided into a horizontal progressive element and a vertical progressive element, wherein the horizontal progressive element is owned by the convex surface side and the vertical progressive element is owned by the concave surface side.

Further, vision area of the progressive-power lens can be broadly divided, based on the distance to a visual target, into three types, which are distance vision type, intermediate vision type and near vision type. However, the vision area of the progressive-power lens may also be divided based on what vision area is emphasized. For example, there are a distance vision emphasized type progressive-power lens, an intermediate vision emphasized type progressive-power lens, a near vision emphasized type progressive-power lens, a distance and intermediate visions emphasized type progressive-power lens, an intermediate and near visions emphasized type progressive-power lens, a distance and near visions emphasized type progressive-power lens, and a distance, intermediate and near visions balanced type progressive-power lens. Further, there is another type of progressive-power lens called "individual progressive-power lens", which is made corresponding not only to general information, such as prescribed power and the like, but also to information other than the general information, such as the distance between the eyeballs of the wearer and the lenses, the tilt angle of the frame, and the line-of-sight of the wearer when the wearer views an object (the habit of the wearer). In such a manner, various designs of the progressive-power lenses are being developed, and diversity is significantly increasing especially in recent years.

In order to reduce the processing time and processing cost, a method for processing the convex surface progressive-power lens, which is the most popular progressive-power lens among the various popular progressive-power lenses mentioned above, is widely used in which the progressive-power surface on the convex surface side of the lens is previously processed, so that only the concave surface side needs to be processed after receiving an order. In such a case, the lens with the convex surface previously processed is particularly called a "semi-finished lens" (abbreviated as "semi" hereinafter).

The various types of progressive-power surfaces mentioned above are designed based on various design concepts by a computer having a lens design program incorporated therein to concretely determine a three-dimensional shape. Generally, the three-dimensional shape is achieved by performing processing using a machine tool called a "numerical control (NC) processing machine". The progressive-power surface can be formed by directly processing the lens material, however, the progressive-power surface is generally formed on a mold or a matrix for molding the mold, so that the semis with stable progressive-power surfaces can be mass-produced by molding (see Patent Document 1).

The process of processing the progressive-power surface by using the NC processing machine is generally called "free-form processing" (see, for example, Patent Document 3, Patent Document 4 and the like).

To process the progressive-power lens after receiving an order, a semi having a suitable base curve (i.e., a curve of a distance portion of the progressive-power surface, also referred to as a "BC") is selected from the inventory of the various mass-produced semis using a previously prepared classification table according to the prescribed power of the wearer, and then a curved surface on the concave surface side is designed and processed using the selected semi so as to meet the prescribed power of the wearer. In such a case, the curved surface on the concave surface side is a relatively simple curved surface such as a spherical surface, a cylindrical surface and the like, and therefore the processing of the curved surface on the concave surface side is far easier than that on the convex surface side. In other words, the convex surface is a progressive-power surface containing addition power elements, while the concave surface is configured as a prescription surface where the other prescription values than the addition power of the entire lens is added, the other prescription values including the cylindrical power, the cylinder axis and the like.

Note that the term "cylindrical power" used in the whole description means a far-sight cylindrical power.

FIG. 11 is a table showing an example of a manufacture range and BC classification of a typical progressive-power lens having a progressive-power surface formed on the convex surface side.

In other words, the manufacture range of FIG. 11 is as the follows:

SPH (spherical power): +8.00~−10.00, and
CYL (cylindrical power): 0.00~−4.00
(SPH+CYL≧−10.00)

The unit of the respective values is diopter (D), and the manufacturing pitch is 0.25 diopter for all items Thus, in FIG. 11, the number of combinations of the SPH and CYL is 1,105, which is equal to the number of the grids of the manufacture range of FIG. 11. Incidentally, "CYL=0.00" means the lens is a spherical lens.

Further, as an example of a typical manufacture range and BC classification, in the case where the number of BC is 5, the number of addition power is 12 (wherein the addition power changes from 0.75 to 3.50 at a pitch of 0.25 diopter), and the lens are respectively designed for both the right eye and left eye, the total number of the kinds of the lenses calculated as follows have to be prepared as semi-finished products (referred to as "semi-finished lenses" or "semis" hereinafter):

5(BC classifications)×12(addition power classifications)×2(left eye/right eye classifications)=120 kinds Next, "curve classification" of the concave surface side of a typical progressive-power lens will be described below.

As shown in FIGS. 12 and 13, the "curve classification" corresponds to the BC classification of the convex surface side shown in FIG. 11, and represents a curve of the curved surface on the concave surface side. Further, FIG. 12 corresponds to a "curve in base direction" (i.e., a shallower curve (D2) on the concave surface side), and FIG. 13 corresponds to a "curve in cross direction" (i.e., a deeper curve (D3) on the convex surface side). Incidentally, the "curve in base direction" is generally called "base curve" as opposed to "cross curve", however, in the present description, to avoid confusion with the term "BC" on the convex surface side, the "curve in base direction" is called as it is.

Herein, the concave surface within a spherical power range is a spherical surface where "D2=D3", the concave surface within a cylindrical power range is a spherical surface where "D2<D3", and cylindrical power CYL is indicated by "D2−D3". In other words, the concave surface within a cylindrical power range has two kinds of different sectional curves D2 and D3, and the direction of the sectional curves D2 is generally called an axial direction of cylindrical power (AXIS). The case of D2<D3 is taken as an example so that CYL<0.00, however, in the case where CYL>0.00, the relation of D2 and D3 will be D2<D3.

Here, the relation between SPH (spherical power), CYL (cylindrical power), BC described in FIG. 11, D2 described in FIG. 12, and D3 described in FIG. 13 can be expressed by the following Equations (1) and (2) as approximate values where the effect of the thickness of the lens is ignored:

$$SPH = BC - D2 \quad (1)$$

$$SPH + CYL = BC - D3 \quad (2)$$

Further, the following Equation (3) can be obtained by subtracting Equations (1) from Equations (2):

$$CYL = D2 - D3 \quad (3)$$

It cab be obviously known from Equations (1) and (2) that the base direction (D2) is a direction of a lens cross-section having "SPH (spherical power)", and the cross direction (D3) is a direction of a lens cross-section having "SPH (spherical power)+CYL (cylindrical power)".

Generally, the axial direction (AXIS) of the cylindrical power is used to express the base direction in degrees measured anti-clockwise from the horizontal right direction, wherein the horizontal right direction is 0°, and the angle varies in a range of 0°~180° in increments of 1°.

Incidentally, the direction of 0° is often expressed as 180°, which represents the same direction. Further, the direction of 180°~360° is generally expressed by a value obtained by subtracting 180° therefrom.

Next, various kinds of the concave surfaces of the typical progressive-power lenses are shown in FIG. 14. FIG. 14 is a table showing a list of combinations of FIG. 12 and FIG. 13, wherein the vertical axis represents the value of D2, and the horizontal axis represents the value of D3 in the case where D3 is equal to CYL. The total number of the kinds of the concave surfaces shown in FIG. 14 is 561 kinds. Generally, in the case of the typical progressive-power lenses, tools (processing plates) respectively corresponding to concave surfaces shown in FIG. 14 are previously prepared to cope with various orders.

Specifically, to process a typical progressive-power lens, a semi having a suitable BC and addition power (ADD, for right eye or left eye) is selected from the inventory of various semis using a previously prepared classification table according to the prescribed power (SPH power and CYL power) of the order, and a curved surface having D2 and D3 on the concave surface side is designed and processed using the selected semi to meet the prescribed power of the wearer. A concrete method for processing the concave surface side is generally used in which a rough grinding process is performed using a machine called a curve generator (CG), and a sanding process and/or polishing process is performed using a convex-shaped tool (a processing plate) having a curve conforming the concave surface of the lens (see, for example, Patent Document 3 and Patent Document 4).

[Patent Document 1] International Patent Publication WO 98/16862
[Patent Document 2] Japanese Unexamined Patent Application Publication No. 2003-84244
[Patent Document 3] International Patent Publication WO 2005/084885
[Patent Document 4] Japanese Unexamined Patent Application Publication No. 2006-312233

DISCLOSURE OF THE INVENTION

Problems to be Solved by the Invention

Recently, wearer's taste to the lens is being diversified into various kinds, and many types of progressive-power lenses based on various design concepts are being developed to satisfy different tastes of the wearers. Further, it becomes possible to select a lens from a plurality of progressive-power lenses to suit the taste and lifestyle of individual users.

However, the more kinds of the wearer's taste to the lens is diversified, the more kinds of different semis need to be prepared by the lens maker, so that the inventory burden of the semis on the lens maker side will be increased. Further, it is recently becoming ubiquitous to design the lenses respectively for the right eye and left eye, and which doubles the number of the kinds of the semis. Thus, there is a need to reduce the inventory burden of the semis on the lens maker side.

Further, in the case of a progressive-power lens whose prescription values include strong cylindrical power, if the cylindrical component is formed on the concave surface only, a deep curve has to be formed on the concave surface side, so that processing becomes difficult.

It is a main object of the present invention to provide a method for manufacturing a progressive-power lens as well as a progressive-power lens, in a manner in which the inventory burden of semis can be reduced.

According to a first aspect of the present invention, a method for manufacturing a progressive-power lens, which is designed by arranging a progressive-power surface on a convex surface and combining the convex surface with a concave surface so as to meet prescription values of a spectacles wearer, includes the steps of: previously preparing the concave surface side as a semi-finished lens group based on a predetermined classification table, corresponding to spherical power and cylindrical power of a manufacturing power range, and selecting a most suitable semi-finished lens according to an order, designing the progressive-power surface on the convex surface side so as to meet the prescription values, and finishing the lens by performing free-form processing.

According to a second aspect of the present invention, in the method for manufacturing the progressive-power lens according to the first aspect, cylindrical component of the semi-finished lens selected based on the order is different from the cylindrical power of the prescription values.

According to a third aspect of the present invention, in the method for manufacturing the progressive-power lens according to the second aspect, the difference between the cylindrical component on the concave surface side of the semi-finished lens and the cylindrical power of the prescription values is equal to or less than 0.75 (D).

According to a fourth aspect of the present invention, in the method for manufacturing the progressive-power lens according to any one of the first to third aspects, cylindrical component on the convex surface side and the cylindrical component of the concave surface side are combined with each other so as to meet the cylindrical power of the prescription values.

A progressive-power lens according to a fifth aspect of the present invention is the one in which cylindrical component is arranged on both a convex surface side and a concave surface side of the lens, in which the cylindrical component arranged on the convex surface side and the cylindrical component arranged on the concave surface are combined with each other so as to meet cylindrical power of prescription values, and in which the convex surface is a combined surface obtained by combining a cylindrical surface with a progressive-power surface.

According to a sixth aspect of the present invention, in the progressive-power lens according to the fifth aspect, the difference between the cylindrical component on the concave surface side and the cylindrical power of the prescription values is equal to or less than 0.75 (D).

According to a seventh aspect of the present invention, in the progressive-power lens according to the fifth or sixth aspect, the cylindrical power of the prescription values is created by combining a cylindrical power based on the cylindrical component of the convex surface, the cylindrical component of the concave surface, and a shift angle between cylinder axes of both surfaces.

According to the present invention, it is possible to design various kinds of progressive-power lens while reducing the inventory burden of concave surface semi-finished lenses (i.e., semi-finished lenses each with a finished concave surface and an unfinished convex surface).

Further, in the case of a progressive-power lens whose prescription values include strong cylindrical power, since the cylindrical component can be dispersed on both the convex surface and the concave surface instead of being concentrated on the convex surface, it is possible to achieve spectacles excellent in processability and appearance.

Further, by using the concave surface semi-finished lens, it is possible to remarkably reduce the damage of the lens caused during storage or during processing, compared with the cases of using a convex surface semi-finished lens (i.e., a semi-finished lens with a finished convex surface and an unfinished concave surface). Furthermore, since the semis are stored with the convex surfaces thereof faced upward, stability during storage can be increased, and axis displacement can be reduced.

BRIEF DESCRIPTION OF DRAWINGS

FIGS. 8A, 8B and 8C are views showing the surface optical performance of the convex surface side of a convex surface progressive-power lens according to Example 3 and a convex surface progressive-power lens according to Example 7.

FIGS. 9A, 9B and 9C are views showing the surface optical performance of the convex surface side of a convex surface progressive-power lens according to Example 4 and a convex surface progressive-power lens according to Example 8.

FIG. 12 is a table showing D2 classification of the concave surface of the conventional progressive-power lens.

FIG. 12 is a table showing D3 classification of the concave surface of the conventional progressive-power lens.

FIG. 14 is a table showing a list of D3 corresponding to D2 of the concave surface of the conventional progressive-power lens.

FIG. 15 is a table showing a manufacture range and BC2 classification of the convex surface of the progressive-power lens according to the aforesaid embodiment.

FIG. 16 is a table showing a manufacture range of and BC3 classification of the convex surface of the progressive-power lens according to the aforesaid embodiment.

FIG. 17 is a table showing D2 classification of the concave surface of the progressive-power lens according to the aforesaid embodiment.

FIG. 18 is a table showing D3 classification of the concave surface of the progressive-power lens according to the aforesaid embodiment.

FIG. 19 is a table showing D2 classification and D3 classification of the concave surface of the progressive-power lens according to the aforesaid embodiment.

FIG. 20 is a table showing a list of concave surface semis, which indicates D3 corresponding to D2 of the concave surface of the progressive-power lens according to the aforesaid embodiment.

BEST MODES FOR CARRYING OUT THE INVENTION

Figure 1:
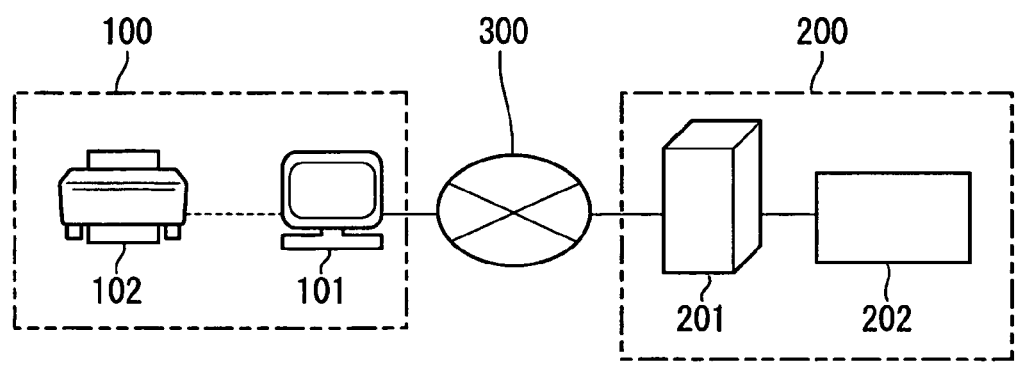
FIG. 1 is a view showing the overall configuration of a spectacle lens manufacturing system according to an embodiment of the present invention.

A method for manufacturing a progressive-power lens as well as a progressive-power lens according to an embodiment of the present invention will be described below.

The present invention is made to provide a new method in which the convex surface of a concave surface semi (i.e., a semi with a finished concave surface and an unfinished convex surface) is processed on a made-to-order basis, in comparison with a conventional method in which the concave surface of a convex surface semi (i.e., a semi with a finished convex surface and an unfinished concave surface) is processed on a made-to-order basis.

Incidentally, in the present embodiment, a lens manufacturing device according to a conventional art proposed by the inventor of the present invention (International Patent Publication WO 2005/084885) can be used. Thus, the present embodiment is described using an example in which the aforesaid conventional art is used. Also described in the present embodiment is a progressive-power lens which is designed by combining the convex surface and the concave surface of the lens so as to meet the prescription values of the wearer of spectacles.

(Selection of Concave Surface Semi)

FIG. 19 shows a classification of a concave surface semi (D2/D3) according to the present embodiment with respect to a vertical axis SPH and a horizontal axis CYL, and is a drawing collectively showing FIG. 17, which only shows D2, and FIG. 18, which only shows D3. Thus, by using FIG. 19 or FIGS. 17 to 18, it is possible to select a concave surface semi according to the present embodiment with respect to the prescribed power of an order.

(Design of Convex Surface)

After selecting the concave surface semi, the convex surface of the selected concave surface semi is designed to meet the prescribed power of the prescribed power of the order.

The convex surface of the progressive-power lens according to the present embodiment is a progressive-power surface with a cylindrical surface as a reference. In other words, the convex surface according to the present embodiment is a progressive-power surface having two reference curves, which are a curve in base direction (a deeper curve called "BC2" hereinafter) and a curve in cross direction (a shallower curve called "BC3" hereinafter), and is a combined surface obtained by adding the cylindrical surface to a normal progressive-power surface. However, in the present embodiment, the relation between BC2 and BC3 is "BC2=BC3" only when the power is in a particular range (CYL=0.00, −1.00, −2.00, −3.00, −4.00), and in such a case, the convex surface of the present embodiment is identical to the convex surface of a conventional convex surface progressive-power lens.

FIGS. 15 and 16 show curve classifications of the convex surface side (the progressive-power surface) according to the present embodiment with respect to the vertical axis SPH and the horizontal axis CYL, wherein FIG. 15 shows BC2 classification that represents the curve in base direction and FIG. 16 shows BC3 classification that represents the curve in cross direction. Thus, by using FIGS. 15 and 16, it is possible to design the reference curve of the convex surface according to the present embodiment with respect to the prescribed power of the order.

In the present embodiment, the relation between SPH (spherical power), CYL (cylindrical power), BC2 and BC2 respectively described in FIGS. 15 and 16, and D2 and D3 respectively described in FIGS. 17 and 18 can be expressed by the following Equations (4) and (5) as approximate values where the effect of the thickness of the lens is ignored:

$$SPH = BC2 - D2 \quad (4)$$

$$SPH + CYL = BC3 - D3 \quad (5)$$

It can be obviously known from Equations (4) and (5) that, "SPH (spherical power)" of the present embodiment is a curve difference between the curve in base direction BC2 on the convex surface side and the curve in base direction D2 on the concave surface side, and "SPH (spherical power)+CYL (cylindrical power)" of the present embodiment is a curve difference between the curve in cross direction BC3 on the convex surface side and the curve in cross direction D3 on the concave surface side.

Further, the following Equation (6) can be obtained by subtracting Equations (4) from Equations (5):

$$CYL = BC3 - BC2 + D2 - D3 \quad (6)$$

In other words, if "BC3−BC2" is called a "cylindrical element on the convex surface side" and "D2−D3" is called a "cylindrical element on the concave surface side", the sum of the progressive-powers on both surface sides is equal to the cylindrical power CYL of the prescribed power.

Here, in FIGS. 17 and 18, if a power range of "SPH=+3.25~+5.00, CYL=0.00~−4.00" is compared with a power range of "SPH=+5.25~+7.00, CYL=0.00~−4.00", it can be known that the combinations of D2 and D3, i.e., the curved surfaces on the concave surface side, of the two power ranges are common to each other. On the other hand, in FIGS. 15 and 16, if the combinations of BC2 and BC3 (i.e., the reference curves of the curved surfaces on the convex surface side) of the same power ranges are compared with each other, it can be known that the reference curve of the latter power range is deeper than the reference curve of the former power range by 2.00 diopter.

This represents the design concept of the present embodiment, namely, to reduce the number of the kinds of the concave surface semis by making the concave surfaces common to each other. Further, with such a method, for example, the manufacture range of the present embodiment is made common to that of the concave surface having a power range of "SPH=+8.25~+10.00, CYL=+6025~+8.00, CYL=0.00~−4.00", so that a reference curve of 2.00 diopter deeper can be used as the reference curve of the curved surface on the convex surface side. In other words, it is possible to extend the manufacture range to the aforesaid power range without increasing the number of the kinds of the concave surface semis.

Incidentally, the unit of the curves such as aforesaid BC, BC2, BC3, D2, D3 and the like is diopter. Such a unit is identical to the unit of power such as SPH, CYL and the like, namely, is a unit for expressing refractive power. The concrete shape of each of these curves is a circular arc whose curvature radius R (mm) can be expressed as the following equation where n represents the refractive index of the lens material:

$$R = 1000(n-1)/D$$

For example, the curvature radius of a 10.00 (D) curve of a lens with a refractive index of 1.600 is calculated as follows:

$$R = 1000(1.600-1)/10.00 = 60 \text{ mm}$$

Note that, as mentioned above, the aforesaid Equations (1) to (6) are all approximate equations where the effect of the thickness of the lens is ignored. Thus, when the thickness of the lens is taken into account, the value of the curve is actually a broken number which can not be divided evenly by 0.25 which is the pitch of the power range. In many cases, the value of the curve on the concave surface side varies with an increment of 0.25 diopter, and the curve on the convex surface side has a value of a broken number. However, for convenience sake, BC is called as "nominal BC" that varies with an increment of 1.00 diopter or 0.50 diopter, and exact BC value is called as "actual BC" for distinction. Although this method can also be applied to the present embodiment, since the semi of the present embodiment is not a convex surface semi, there is not much convenience to apply the nominal curve to BC2 and BC3. Further, in the concave surface semi of the present embodiment, since D2 and D3 both vary with an increment of 1.00 diopter exactly, it is not necessary to distinguish between the actual curve and the nominal curve.

The existence of the difference between the cylindrical component (D2–D3) in the concave surface semi classification table shown in FIG. 19 and the cylindrical power CYL of the horizontal axis, and the method for dealing with such a difference will be described below.

The present embodiment is made to provide a new method in which the convex surface of a concave surface semi is processed on a made-to-order basis, in comparison with a conventional method in which the concave surface of a convex surface semi is processed on a made-to-order basis. However, since the cylindrical surface on the conventional concave surface side corresponds to the ordered power and therefore a large variety of kinds of semis is needed, it is inconvenient to previously prepare these semis. In the present embodiment, a method is used in which the classification of the cylindrical surface on the concave surface side is rough (at a pitch of, for example, 1 diopter), and the resultant difference to the ordered power (at a pitch of 0.25 diopter generally) is corrected when processing the convex surface on a made-to-order basis. Since there is no difference either between addition powers and or between the right and left, the number of the kinds of the semis can be remarkably reduced compared to the conventional method, and therefore the inventory burden can be reduced.

It is not optically preferable to form the cylindrical component on the convex surface side because it will cause difference in image magnification between the base direction and the cross direction. However, if the cylindrical component formed on the convex surface side is 1.00 diopter or lower, preferably 0.75 diopter or lower, as in the present embodiment, the actual harm is considered to be small.

(Concave Surface Classification and Design Concept)

The relation between the concave surface semi classification and the design concept will be described below in detail.

The power range of the lenses to be manufacture is a design matter, and is determined by the lens maker. In general, the wider the power range is, the more the kinds of the concave surface semis (D2/D3) of the aforesaid classification have to be prepared. Further, the more minute the classification is, the more preferable curve combination excellent in optical performance can be made, however, the balance with the design content, cost and the inventory burden has to be adjusted.

(Convex Surface Free-Form Processing)

Further, after selecting the concave surface semi, the progressive-power surface of the convex surface side of the present embodiment can be finished by performing a free-form processing (referred to as "FF processing" hereinafter) on the convex surface side of the selected concave surface semi.

As described above, the various types of progressive-power surfaces of nowadays are designed based on various design concepts by a computer having a lens design program incorporated therein to concretely determine the three-dimensional shape. Generally, the three-dimensional shape is achieved by processing the lens using a machine tool called a "numerical control (NC) processing machine".

The numerical control (NC) grinding/polishing device of nowadays has so high performance that it can perform simultaneous multiaxial (3-axial to 7-axial) control, so that various complicated three-dimensional shapes can be processed. Thus, the various progressive-power surfaces on the convex surface side of the present embodiment, and the combined surfaces obtained by adding the cylindrical surfaces to these progressive-power surfaces can be obtained by directly grinding and polishing the convex surface of the concave surface semi (see, for example, the patent document relating to the aforesaid conventional art, and the numerical control (NC) grinding/polishing device shown in FIGS. 2 and 4).

Figure 2:
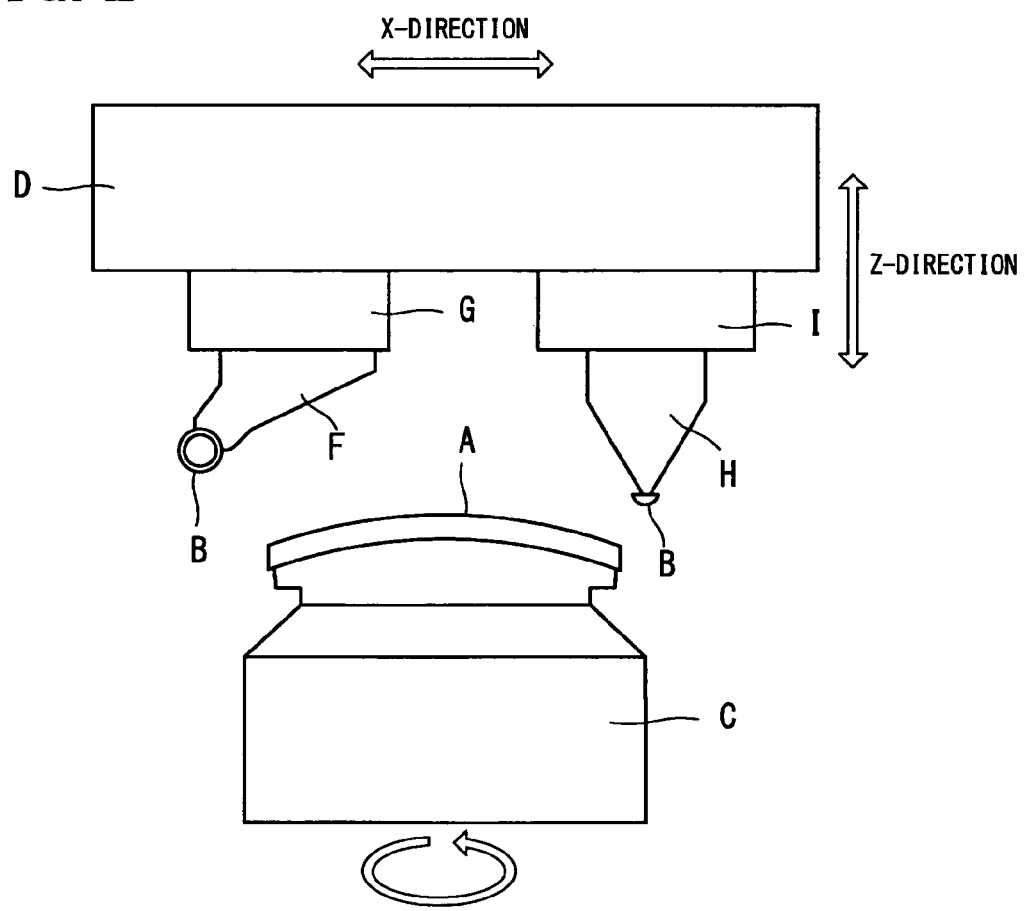
FIG. 2 is a view schematically showing the configuration of a curve generator.

FIG. 2 is a view schematically showing the configuration of a curve generator. As shown in FIG. 2, the curve generator is a cutting tool (bite) for cutting a lens material A, and includes a lower shaft C for attaching the lens material A, an upper shaft D, a first upper shaft portion G and a second upper shaft portion I both attached to the upper shaft D, a first bite F attached to the first upper shaft portion G, a second bite H attached to the second upper shaft portion I, and two cutting blades B respectively attached to the tip end of the first bite F and the tip end of the second bite H, wherein the first bite F is adapted to perform a rough cutting processing and the second bite H is adapted to perform a finish cutting processing.

The cutting blades B are each formed of a sintered polycrystalline diamond or a natural single crystal diamond.

The lower shaft C performs an axis rotation without displacement. The upper shaft D is driven in both an X-direction (horizontal direction) and a Z-direction (vertical direction). In such a manner, the processing is controlled in a total of 3 shafts by the lower shaft C and the upper shaft D.

The switch between the first bite F and the second bite H can be performed by sliding the upper shaft D relative to the fixed lower shaft C.

In the curve generator, the first bite F for rough cutting and the second bite H for finish cutting is sequentially used to perform cutting processing on the convex surface of the lens material A attached to the lower shaft C.

Figure 4:
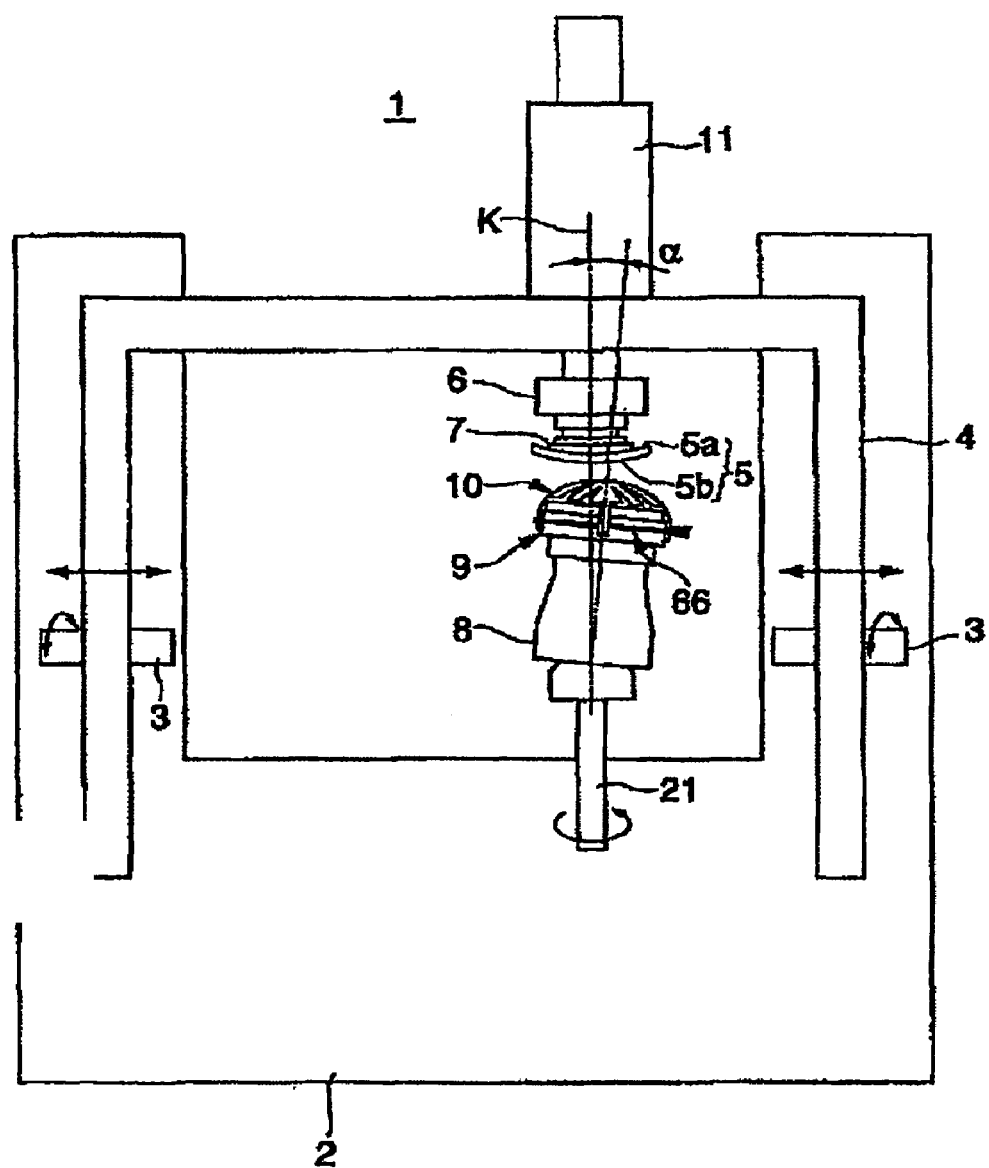
FIG. 4 is a view showing the overall configuration of a polishing device.

FIG. 4 is a view schematically showing the configuration of the polishing device. As shown in FIG. 4, in a polishing device 1, an arm 4 is attached to a device body 2, wherein the arm 4 can be moved in a left-and-right direction of the drawing and can be rotated in a direction perpendicular to the paper surface of the drawing with a horizontal shaft 3 as the rotation center.

Further, the arm 4 is provided with a lens holding section 6, and an elevating device 11 for moving up and down the lens holding section 6.

The lens holding section 6 holds a concave surface 5a of a lens blank 5 through a lens holder 7.

A rocking device 8, which performs an oscillating and turning motion with a vertical axis as the center, is arranged under the lens holding section 6. The rocking device 8 is obliquely attached so that it performs the oscillating and turning motion at a rocking angle α (for example, 5°) with respect to a vertical rotary shaft 21. The rotary shaft 21 is attached to the device body 2.

A polishing jig 9 is detachably attached to an upper surface of the rocking device 8. A polishing pad 10 is detachably attached to a surface of the polishing jig 9.

The polishing processing is performed in the following manner using the polishing device 1.

The lens 5 after cutting processing is mounted to the lens holding section 6 of the arm 4 with a convex surface 5b faced downward, the lens 5 having the lens holder 7 attached thereto. Further, the polishing jig 9, which has the polishing pad 10 attached thereto, is attached to the upper surface of the rocking device 8.

Further, the lens 5 is moved down by the elevating device 11, so that the convex surface 5b is pressed against the surface of the polishing pad 10. In such a state, abrasive is supplied to the surface of the polishing pad 10, and the arm 4 is caused to perform a reciprocating motion in both the left-and-right direction and back-and-forth direction while the rocking device is caused to perform the oscillating and turning motion. By performing these motions, the convex surface 5b of the lens 5 is polished by the polishing pad 10 and the abrasive with a track-less polishing locus in which the polishing locus is deviated for each turn.

EXAMPLES

Examples of the present invention will be described below.

Figure 3:
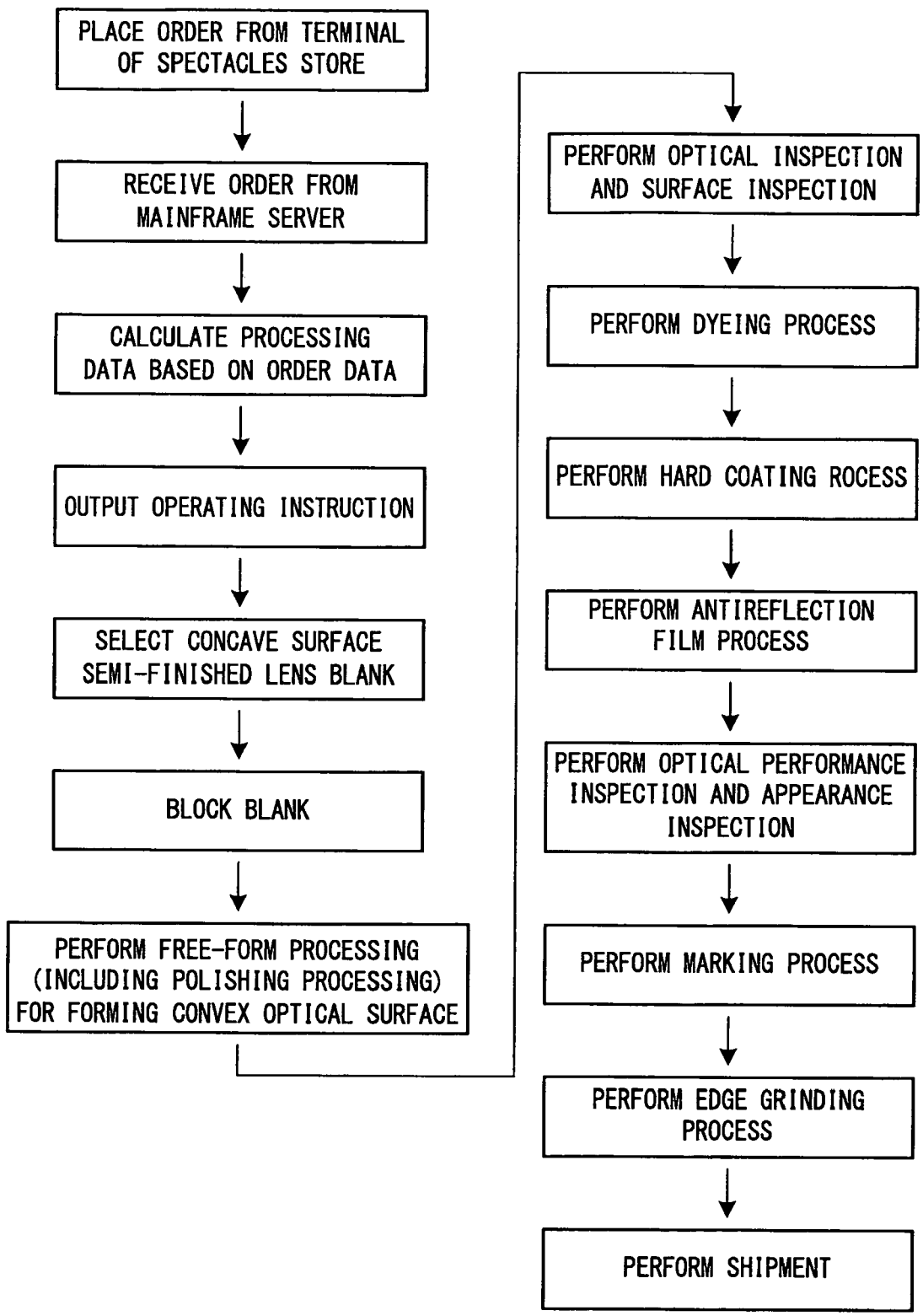
FIG. 3 is a flowchart for explaining manufacturing process of the spectacle lens manufacturing system according to the aforesaid embodiment.

FIG. 1 is a view showing the overall configuration of a spectacle lens manufacturing system according to present embodiment, and FIG. 3 is a flowchart for explaining manufacturing process of the spectacle lens manufacturing system.

Incidentally, since the manufacturing process is a typical example, it will be described in brief instead of in detail.

In the system shown in FIG. 1, a spectacles store 100 and the factory 200 are connected with each other through a public communication line 300.

The spectacles store 100, which is an ordering party, has an order terminal 101 and a frame measuring device 102 for measuring frames.

The factory 200 has a lens design device 201 and a processing section 202.

The lens design device 201 is configured by a computer, peripheral devices of the computer and the like, and is adapted to perform design with a computer program.

The processing section 202 is configured by a processing device for processing lens, a control device for controlling the processing device, and the like.

Incidentally, although only one spectacles store 100 is shown in FIG. 1, there are actually a plurality of spectacles stores 100 connected with the factory 200. Further, in addition to the spectacles stores 100, the ordering party also includes opthalmologic clinics, individuals and the like.

With the system shown in FIG. 1, the lenses are manufactured following, for example, a flow shown in FIG. 3.

In the spectacles store 100, prescription information of the spectacle lens is acquired by inputting various data from the order terminal 101, and the acquired information is transmitted to the factory 200 through the public communication line 300, so that the order is placed.

Further, information such as the prescription information is acquired by the lens design device (for example, a mainframe server) 201, and thereby the order is received.

Next, the lens design device 201 calculates the processing data of the spectacle lens to suit the ordered data (the prescription information and the like). Based on the calculated results, an operating instruction for processing is outputted. As the content of the operating instruction for processing, the processing data is transmitted from the lens design device 201 to the processing section 202.

Next, a concave surface semi-finished lens blank (a plastic material having only concave surface processed) is selected. Further, the selected blank is blocked. In other words, the blank is held by a holding member (a block).

Next, a free-form processing (including polishing processing) for forming an optical surface is performed on the convex surface of the lens.

Next, optical inspection and surface inspection are performed on the processed lens.

Further, various processes such as dyeing process, hard coating process, antireflection film process, lens's optical performance inspection, appearance inspection, marking process, edge grinding process and the like are performed.

With the above processes, the manufacture of the lens is completed.

Further, the manufactured lenses are shipped.

Examples of the characterizing portion of the present invention will be described below.

Example 1

Figure 6C:
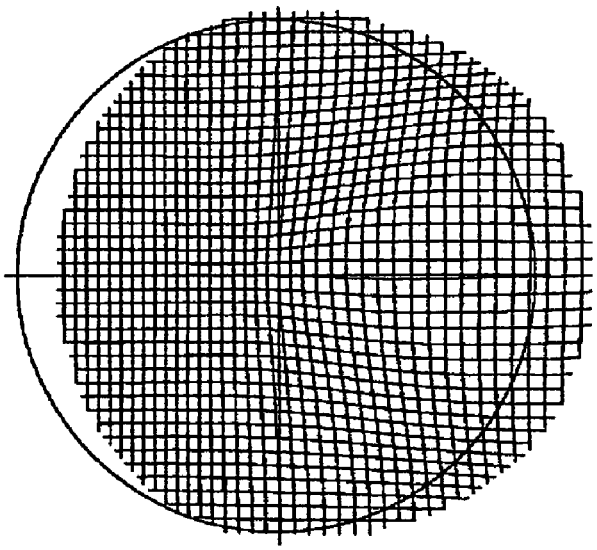
FIGS. 6A, 6B and 6C are views showing the surface optical performance of the convex surface side of a convex surface progressive-power lens according to Example 1.
Figure 6B:
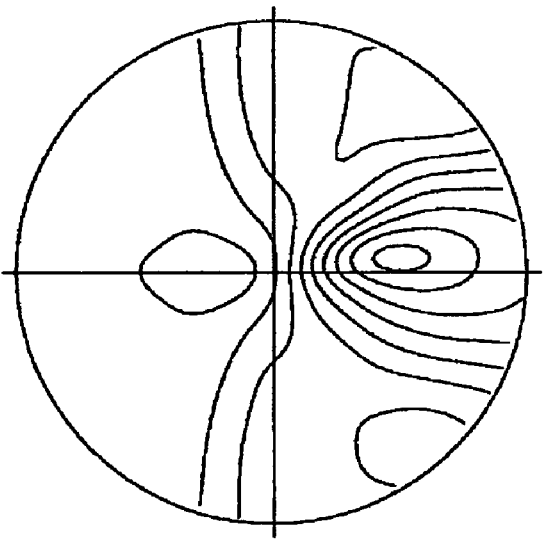
Figure 6A:
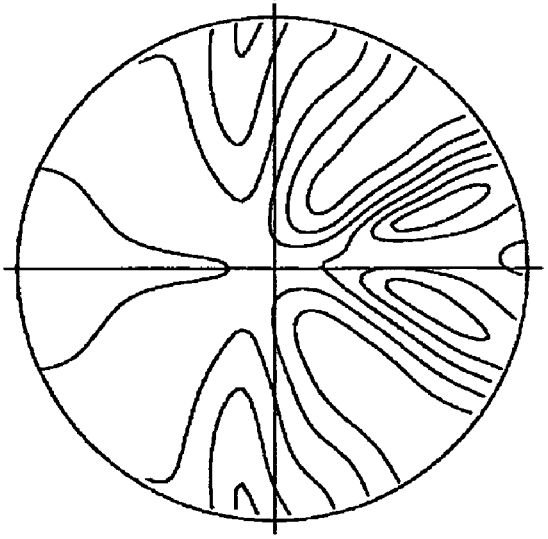
Figures 7A, 7B, 7C:
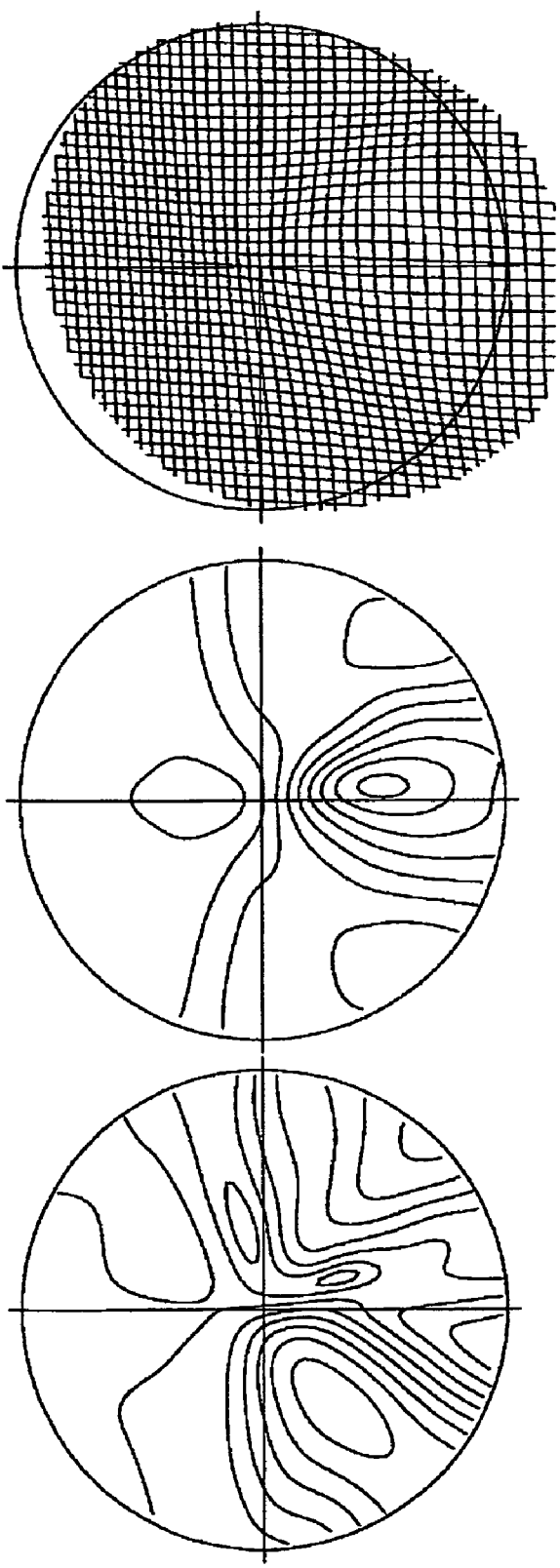
FIGS. 7A, 7B and 7C are views showing the surface optical performance of the convex surface side of a convex surface progressive-power lens according to Example 2 and a convex surface progressive-power lens according to Example 6.
Figure 10C:
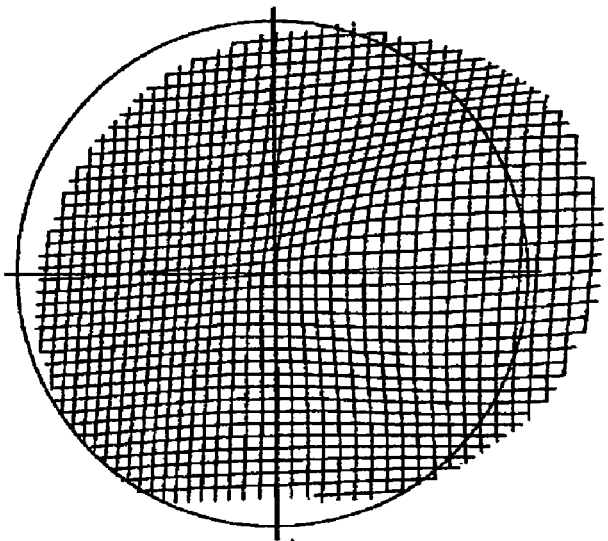
FIGS. 10A, 10B and 10C are views showing the surface optical performance of the convex surface side of a convex surface progressive-power lens according to Example 5 and a convex surface progressive-power lens according to Example 9.
Figure 10B:
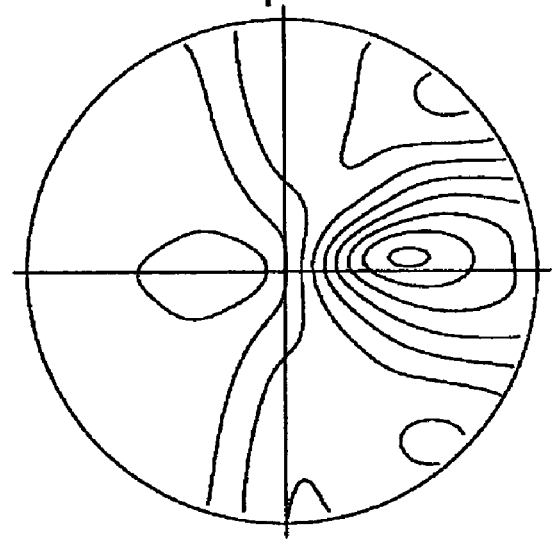
Figure 10A:
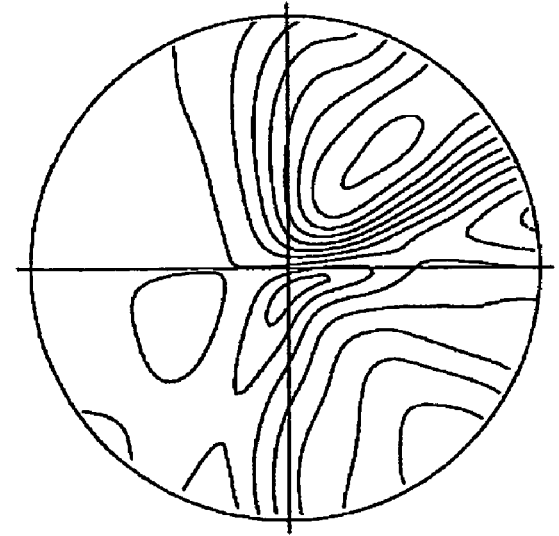

FIGS. 6A to 6C are views showing the optical performance of a progressive-power lens according to Example 1 of the present invention in which the prescribed power is "SPH: −0.25(D), CYL: −1.75(D), AXIS: 180°", the addition power (ADD) is 2.00 (D), and the refractive index of the lens material is $n_e$=1.60, wherein FIG. 6A shows a surface astigmatism distribution map of the convex surface, FIG. 6B shows a surface average refractive power distribution map of the convex surface, and FIG. 6C is a schematic view showing distortion when seeing a grid chart through the lens whose concave surface is processed by spherical. Incidentally, the contours in FIGS. 6A and 6B are drawn at a pitch of 0.25 D.

Figure 5C:
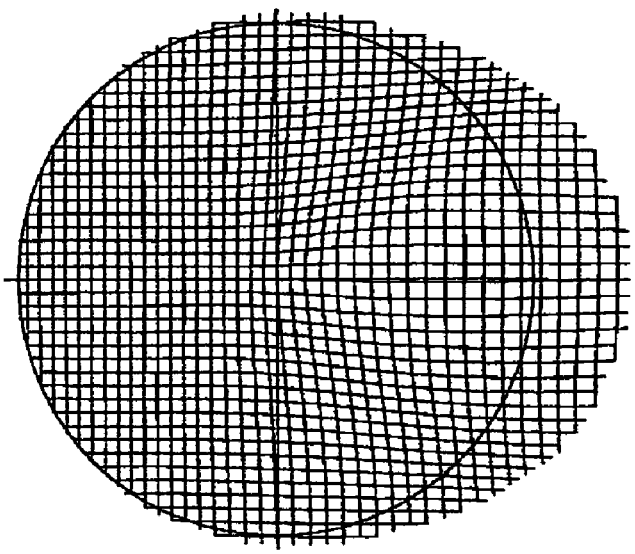
FIGS. 5A, 5B and 5C are views showing surface optical performance of the convex surface side of a conventional convex surface progressive-power lens.
Figure 5B:
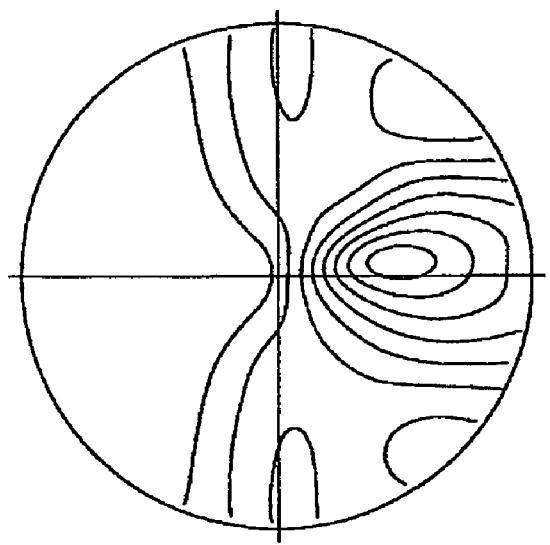
Figure 5A:
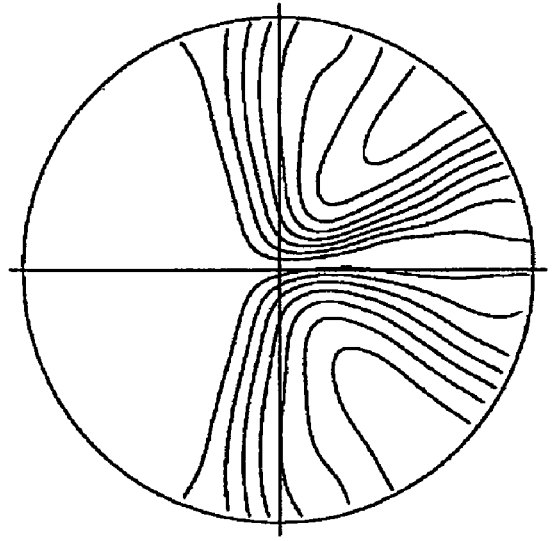

FIGS. 5A to 5C are views showing the surface optical performance of the convex surface side of a conventional convex surface progressive-power lens, wherein, similar to FIGS. 6A to 6C, FIG. 5A shows a surface astigmatism distribution map of the convex surface, FIG. 5B shows a surface average refractive index distribution map of the convex surface, and FIG. 5C is a schematic view showing distortion when seeing a grid chart through the lens whose concave surface is processed by spherical.

It is obviously known by comparing FIGS. 6A to 6C with FIGS. 5A to 5C that the surface astigmatism distribution maps of the both are greatly different from each other.

In other words, since the convex surface of the progressive-power lens according to the present embodiment is a progressive-power surface with the cylindrical surface as a reference, the surface astigmatism distribution map of the convex surface of the progressive-power lens of the present embodiment is greatly different from that of the convex surface of the conventional progressive-power lens.

In other words, this is because the convex surface according to the present embodiment is a progressive-power surface having two reference curves, which are a curve in base direction (a deeper curve called "BC2" hereinafter) and a curve in cross direction (a shallower curve called "BC3" hereinafter), and is a combined surface obtained by adding the cylindrical surface to a normal progressive-power surface.

Further, the progressive-power lens of Example 1 is a lens made by the steps of: selecting a semi of "D2=6.00, D3=7.00" corresponding to the prescribed power of "SPH: 0.25(D), CYL: −1.75(D)" according to the concave surface semi classification table of FIG. 19, and designing and processing the selected semi so that the base direction of the both surfaces is equal to "AXIS=180°" of the prescription value.

To describe the design classification of the concave surface side in more detail, FIG. 17 is a design classification table of curve D2 in the base direction of the concave surface of the progressive-power lens according to the present embodiment, and FIG. 18 is a design classification table of curve D3 in the cross direction of the concave surface of the progressive-power lens according to the present embodiment. FIG. 19 is obtained by combining FIG. 17 and FIG. 18 into one design classification table of the concave surface semi, and FIG. 20 is a table showing a list of kinds of the semis of FIG. 19.

In other words, FIGS. 15 and 16 correspond to the convex surface of the progressive-power lens according to the present embodiment, and FIGS. 17 and 18 correspond to the concave surface of the progressive-power lens according to the present embodiment. The concave surface and the convex surface each have two kinds of correspondence tables corresponding thereto, this is because both the concave surface and the convex surface include cylindrical component, and the curve in the base direction is different from the curve in the cross direction.

Further, by aligning the cylinder axes of the both surfaces with each other, it is possible to add the cylindrical components of the both surfaces to each other.

Here, the number of the kinds of the cylindrical components of the convex surface is four: "0.00(D), 0.25(D), 0.50 (D), 0.75(D)", and the number of the kinds of the cylindrical components of the concave surface is five: "0.00(D), 1.00(D), 2.00(D), 3.00(D), 4.00(D)", so that, by combining the cylindrical components of the both surfaces, seventeen kinds of cylindrical powers within a range of "CYL=0.00(D) to −4.00 (D)" at a pitch of 0.25 (D) can be formed.

In other words, as is known from FIGS. 19 and 20, the pitch of the cylindrical component on the concave surface side is set to a single value of 1.00(D), and therefore there are only five kinds of the cylindrical components in the total power range. Further, the pitch of the curve D2 in the base direction on the concave surface side is set to a single value of 1.00(D), and therefore there are only eleven kinds of curves D2 in the total power range.

Figure 11:
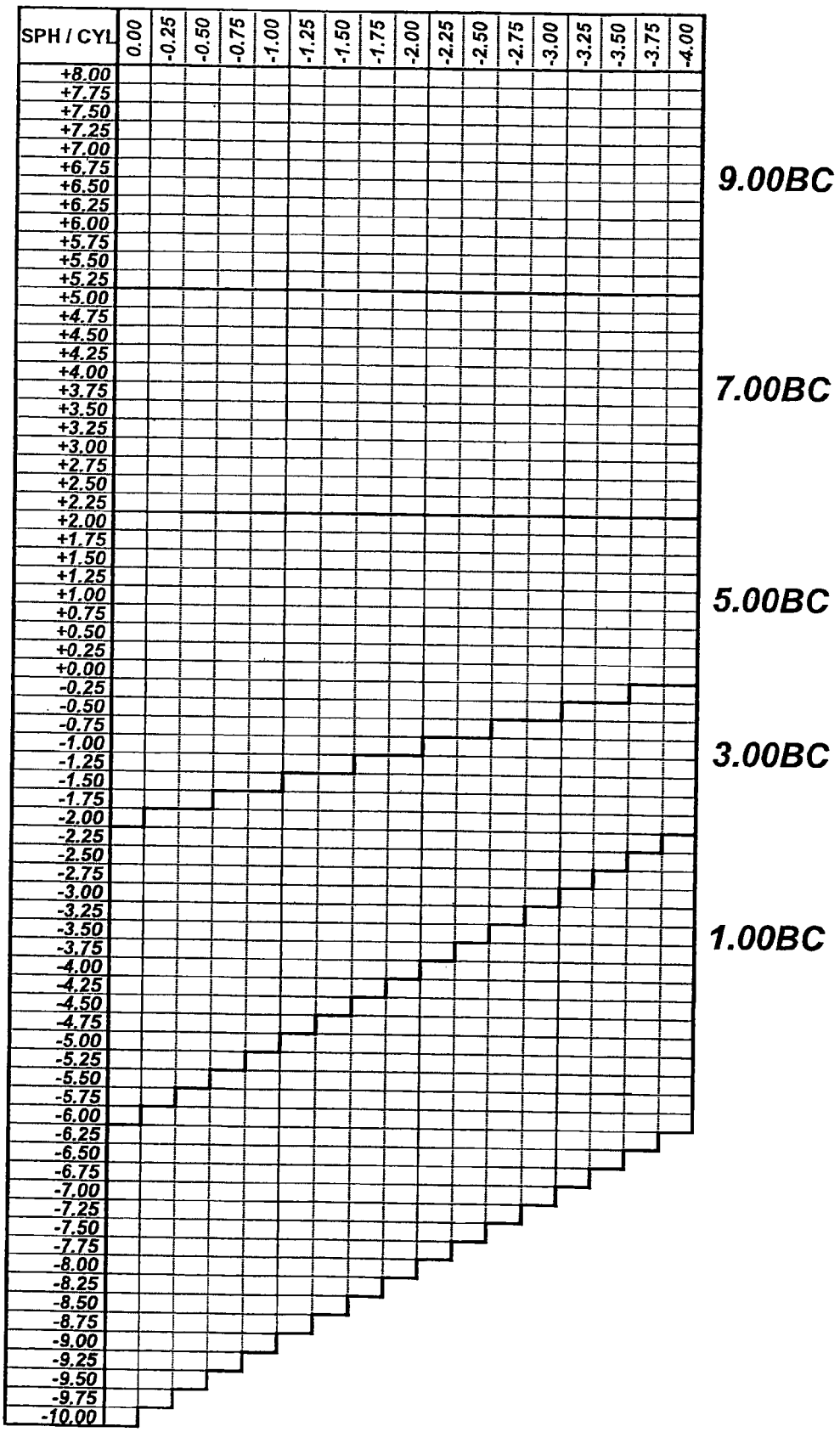
FIG. 11 is a table showing a manufacture range and BC classification of the convex surface of the conventional progressive-power lens.

As a result, the same manufacture range as that of the conventional progressive-power lens shown in FIG. 11 can be covered by only forty-five kinds of concave surface semis, which is equal to the number of the grids of FIG. 20.

The number of forty-five kinds of the present embodiment is only a third of the number of the kinds of the convex surface semis of the aforesaid conventional progressive-power lens (one hundred and twenty kinds), and is a very small number as the number of the kinds of the semis having to be previously prepared, therefore it is extremely advantageous in manufacture.

Here, the details of that "the prescribed cylindrical power of 'CYL=−1.75(D)' of Example 1 is formed by combining the cylindrical components of the both surfaces with each other" will be described below. As described above, a semi of "D2=6.00(D), D3=7.00(D)" is selected for the concave surface side of Example 1, and the cylindrical component on the concave surface side is 1.00(D). On the other hand, since a cylindrical surface of "BC2=5.75, BC3=5.00" is set as the reference of the progressive-power surface on the convex surface side, the cylindrical component on the convex surface side is 0.75(D), and the prescribed cylindrical power of "CYL=−1.75(D)" is achieved by combining the cylindrical components of the both surfaces with each other.

On the other hand, although the number of the kinds of the designs (the semi classifications) on the concave surface side of the progressive-power lens according to the present embodiment is reduced, the number of the kinds of the designs on the convex surface side is increased instead. However, since the known free-form processing technique, in which the lens designed and processed after receiving the order, is used and thereby manufacture can be performed without being conscious of the increased number of the kinds, the increased number of the kinds of the designs on the convex surface side is not a disadvantage of the present invention.

Further, if the lens is designed to negate the cylindrical components of the convex surface and the concave surface by changing the positive/negative of the cylindrical components, a progressive-power lens having spherical power can be manufactured.

Examples 2 to 5

Similar to Example 1, FIGS. 7A to 7C, FIGS. 8A to 8C, FIGS. 9A to 9C and FIGS. 10A to 10C show surface astigmatism distribution maps of the convex surfaces, surface average refractive power distribution maps of the convex surfaces and schematic views showing distortion when seeing a grid chart through the lens whose concave surface is processed by spherical, of Examples 2 to 5 respectively, wherein the prescribed powers are respectively the following:
(Example 2) SPH=−1.25, CYL=−0.75, AXIS 30°
(Example 3) SPH=−0.25, CYL=−1.75, AXIS 60°
(Example 4) SPH=−0.25, CYL=−2.75, AXIS 90°
(Example 5) SPH=−1.25, CYL=−0.75, AXIS 135°

Similar to Example 1, in the design classification tables of both the convex surface and the concave surface, the following values are obtained for Examples 2 to 5.
(Example 5) BC2=5.75, BC3=5.00, D2=7.00, D3=7.00
(Example 3) BC2=5.75, BC3=5.00, D2=6.00, D3=7.00
(Example 4) BC2=5.75, BC3=5.00, D2=6.00, D3=8.00
(Example 5) BC2=5.75, BC3=5.00, D2=7.00, D3=7.00

Further, the base directions of the both surfaces (i.e., the BC2 direction on the convex surface side, and the D2 direction on the concave surface side) are designed so as to be equal to the AXIS of the prescription value.

Examples 6 to 9

Similar to Examples 1 to 5, FIGS. 7A to 7C, FIGS. 8A to 8C, FIGS. 9A to 9C and FIGS. 10A to 10C show surface astigmatism distribution maps of the convex surfaces, surface average refractive power distribution maps of the convex surfaces and schematic views showing distortion when seeing a grid chart through the lens whose concave surface is processed by spherical, of Examples 6 to 9 respectively, wherein the prescribed powers are respectively the following:
(Example 6): SPH=+1.25, CYL=−0.75, AXIS 30°
(Example 7): SPH=+0.25, CYL=−1.75, AXIS 60°
(Example 8): SPH=+0.25, CYL=−2.75, AXIS 90°
(Example 9): SPH=+1.25, CYL=−0.75, AXIS 135°

Similar to Example 1, in the design classification tables of both the convex surface and the concave surface, the following values are obtained for Examples 6 to 9.
(Example 6) BC2=4.25, BC3=3.50, D2=3.00, D3=3.00
(Example 7) BC2=4.25, BC3=3.50, D2=4.00, D3=5.00
(Example 8) BC2=4.25, BC3=3.50, D2=4.00, D3=6.00
(Example 9) BC2=4.25, BC3=3.50, D2=3.00, D3=3.00

Further, the base directions of the both surfaces (i.e., the BC2 direction on the convex surface side, and the D2 direction on the concave surface side) are designed so as to be equal to the AXIS of the prescription value.

The design concept of these examples is: in the classification table of the concave surface, since the pitch of the cylindrical component (D2-D3) is set to a single value of 1.00 diopter including 0.00 diopter (spherical surface), the cylindrical component unable to be reached on the concave surface side is added to the progressive-power surface on the convex surface side so as to form a combined surface, and the value to be adjusted is controlled within a range of 0.25 (D) to 0.75 (D), so that if the value to be adjusted exceeds 0.75 (D), the adjustment is achieved by selecting the base curve (D2 and D3) of the concave surface side. Such a configuration is made out of a consideration for reducing the cylindrical component formed on the convex surface side as can as possible.

Further, in these examples, the cylindrical component of the concave surface is set so as not to exceed the prescribed cylindrical component. However, if the cylindrical component of the concave surface is allowed to be up to a value 0.25 (D) higher than the prescribed cylindrical component, the cylindrical element on the convex surface side can be set to a value not exceeding 0.50 (D) by shifting the concave surface semi classification to the left by one row.

For example, when the value of the CYL column of FIG. 19 (which represents the prescribed cylindrical component) is in the range of 0.00 (D) to −0.75 (D), the cylindrical component on the concave surface side (D2-D3) is "D2=D3", i.e., 0.00 (D), without exception, and which is a value equal to or less than the prescribed cylindrical component (value of the CYL column).

Similarly, when the value of the CYL column is in the range of −1.00 (D) to −1.75 (D), the cylindrical component on the concave surface side is −1.00 (D); when the value of the CYL column is in the range of −2.00 (D) to −2.75 (D), the cylindrical component on the concave surface side is −2.00 (D); when the value of the CYL column is in the range of −3.00 (D) to −3.75 (D), the cylindrical component on the concave surface side is −3.00 (D); and when the value of the CYL column is −4.00 (D), the cylindrical component on the concave surface side is −4.00 (D). Therefore, it can be known that in any case the cylindrical component on the concave surface side is a value equal to or less than the prescribed cylindrical component (value of the CYL column).

Further, the difference between the value of the CYL column and the value of the correspondent cylindrical component on the concave surface side ((D2−D3)−CYL) does not exceed 0.75 (D). As described above, since the cylindrical component unable to be reached on the concave surface side is added to the convex surface side, the cylindrical element on the convex surface side does not exceed 0.75 (D).

To make the cylindrical element on the convex surface side not exceed 0.50 (D), the value of the cylindrical component on the concave surface side can be increased by 1.00 (D) by shifting the concave surface semi classification of FIG. 19 to the left by one row, with respect to the range in which the difference between the value of the CYL column and the value of the correspondent cylindrical component on the concave surface side does not exceed 0.75 (D). Thereby the difference between the value of the CYL column and the value of the correspondent cylindrical component on the concave surface side ((D2−D3)−CYL) is reduced to "0.75(D)−1.00(D)=−0.25(D)". This means that the cylindrical component on the concave surface side is 0.25 (D) higher than the prescribed cylindrical component.

All above mentioned cases are included in the scope of the present invention.

As described above, the cylinder axes of the both surfaces (i.e., the BC2 direction on the convex surface side, and the D2 direction on the concave surface side) are aligned with the prescribed AXIS in Examples 1 to 5, however, the present invention also includes the cases where the cylinder axes of the both surfaces are not aligned with the prescribed AXIS. In other words, if the cylinder axes of the both surfaces are purposely shifted from each other instead of being aligned with each other, various cylindrical powers can be obtained corresponding to the values of the cylindrical components of the both surfaces and the shift angle between the cylinder axes of the both surfaces.

For example, if the cylindrical component of the convex surface is 0.75 (D) and the cylindrical component of the concave surface is 0.75 (D) too, the following cylindrical powers can be obtained.

i) If the cylinder axes of the both surfaces are aligned with each other, the cylindrical components will be added to each other, and therefore the cylindrical power becomes 1.50 (D).

ii) If the cylinder axes of the both surfaces are perpendicular with each other, the cylindrical components will cancel each other, and therefore the cylindrical power becomes 0.00 (D).

iii) If the cylinder axes of the both surfaces are shifted from each other by a shift angle of 60°, the cylindrical power will become 0.75 (D).

In such a manner, by suitably setting the shift angle between the cylinder axes of the both surfaces, the following seven kinds of cylindrical powers can be obtained using only one kind of concave surface semi: 0.00 D (shift angle 90.0°), 0.25 D (shift angle 80.4°), 0.50 D (shift angle 70.5°), 0.75 D (shift angle 60.0°), 1.00 D (shift angle 48.2°), 1.25 D (shift angle 33.6°), 1.50 D (shift angle 0.0°). Incidentally, the axial direction of the cylindrical power obtained in such a manner is the center direction of the shift angle (an acute angle) between the cylinder axes of the both surfaces.

Incidentally, the calculation of the cylindrical power will be complicated more or less if the cylindrical component of the convex surface and the cylindrical component of the concave surface are not equal to each other, however, it is possible to calculate the cylindrical power by using a calculation technique for combining two kinds of cylindrical powers.

The present invention can be preferably used for manufacturing progressive-power lenses.

EXPLANATION OF REFERENCE NUMERALS

1 polishing device
2 device body
4 arm
5 lens
5b convex surface
7 lens holder
8 rocking device
9 polishing jig
10 polishing pad
100 spectacles store
200 factory
201 lens design device
300 public communication line

The invention claimed is:

1. A method for manufacturing a progressive-power lens, which is designed by arranging a progressive-power surface on a convex surface and combining the convex surface with a concave surface so as to meet prescription values of a spectacles wearer, the method comprising the steps of:
previously preparing the concave surface side as a semi-finished lens group based on a predetermined classification table, corresponding to spherical power and cylindrical power of a manufacturing power range, and
selecting a most suitable semi-finished lens according to an order, designing the progressive-power surface on the convex surface side so as to meet the prescription values, and finishing the lens by performing free-form processing.

2. The method for manufacturing the progressive-power lens according to claim 1, wherein cylindrical component on the convex surface side and the cylindrical component of the concave surface side are combined with each other so as to meet the cylindrical power of the prescription values.

3. The method for manufacturing the progressive-power lens according to claim 1, wherein cylindrical component of the semi-finished lens selected based on the order is different from the cylindrical power of the prescription values.

4. The method for manufacturing the progressive-power lens according to claim 3, wherein the difference between the cylindrical component on the concave surface side of the semi-finished lens and the cylindrical power of the prescription values is equal to or less than 0.75 (D).

5. The method for manufacturing the progressive-power lens according to claim 4, wherein a cylindrical component on the convex surface side and the cylindrical component of the concave surface side are combined with each other so as to meet the cylindrical power of the prescription values.

6. The method for manufacturing the progressive-power lens according to claim 3, wherein a cylindrical component on the convex surface side and the cylindrical component of the concave surface side are combined with each other so as to meet the cylindrical power of the prescription values.

7. A progressive-power lens,
wherein cylindrical component is arranged on both a convex surface side and a concave surface side of the lens,
wherein the cylindrical component arranged on the convex surface side and the cylindrical component arranged on the concave surface are combined with each other so as to meet cylindrical power of prescription values, and
wherein the convex surface is a combined surface obtained by combining a cylindrical surface with a progressive-power surface.

8. The progressive-power lens according to claim 7, wherein the cylindrical power of the prescription values is created by combining a cylindrical power based on the cylindrical component of the convex surface, the cylindrical component of the concave surface, and a shift angle between cylinder axes of both surfaces.

9. The progressive-power lens according to claim 7, wherein the difference between the cylindrical component on the concave surface side and the cylindrical power of the prescription values is equal to or less than 0.75 (D).

10. The progressive-power lens according to claim 9, wherein the cylindrical power of the prescription values is created by combining a cylindrical power based on the cylindrical component of the convex surface, the cylindrical component of the concave surface, and a shift angle between cylinder axes of both surfaces.

* * * * *